(12) United States Patent
Tamura et al.

(10) Patent No.: US 8,439,149 B2
(45) Date of Patent: May 14, 2013

(54) BRAKE EQUIPMENT OF VEHICLE WITH DRIVER SEAT WHOSE DIRECTION IS CHANGEABLE

(75) Inventors: Jun Tamura, Kawaguchi (JP); Tomoki Hirabayashi, Kamakura (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/392,730

(22) PCT Filed: Mar. 2, 2011

(86) PCT No.: PCT/JP2011/001220
§ 371 (c)(1),
(2), (4) Date: Feb. 27, 2012

(87) PCT Pub. No.: WO2011/108265
PCT Pub. Date: Sep. 9, 2011

(65) Prior Publication Data
US 2012/0152633 A1    Jun. 21, 2012

(30) Foreign Application Priority Data
Mar. 2, 2010 (JP) ................................. 2010-044875

(51) Int. Cl.
*B60T 8/26* (2006.01)
(52) U.S. Cl.
USPC ........ 180/326; 180/89.13; 180/315; 180/323; 180/329; 701/50; 701/70
(58) Field of Classification Search ............... 180/89.13, 180/89.1, 315, 321, 323, 326, 329; 701/50, 701/70
See application file for complete search history.

(56) References Cited

U.S. PATENT DOCUMENTS

| | | | | |
|---|---|---|---|---|
| 5,366,281 | A | * | 11/1994 | Littlejohn ......................... 303/3 |
| 5,823,636 | A | * | 10/1998 | Parker et al. ...................... 303/3 |
| 6,305,758 | B1 | * | 10/2001 | Hageman et al. .......... 303/115.2 |
| 6,390,565 | B2 | * | 5/2002 | Riddiford et al. ................. 303/3 |
| 6,971,471 | B2 | * | 12/2005 | Baker et al. .................... 180/329 |
| 6,991,060 | B2 | * | 1/2006 | Chernoff et al. .............. 180/326 |
| 2010/0320022 | A1 | * | 12/2010 | Klas et al. ..................... 180/326 |
| 2011/0066345 | A1 | * | 3/2011 | Nasu et al. ....................... 701/70 |
| 2011/0202250 | A1 | * | 8/2011 | Miyajima et al. ............... 701/70 |
| 2011/0278913 | A1 | * | 11/2011 | Kim ................................... 303/3 |

FOREIGN PATENT DOCUMENTS

JP    2004-312943 A    11/2004

\* cited by examiner

*Primary Examiner* — Ruth Ilan
*Assistant Examiner* — Darlene P Condra
(74) *Attorney, Agent, or Firm* — Foley & Lardner LLP

(57) ABSTRACT

A brake equipment of the driver-seat-direction changeable vehicle includes: a driver-seat-direction detector configured to detect whether the driver seat is facing the one or the other side, in the travel direction, of the wheel-side vehicle body; a braking unit configured to brake one-side wheels, which are located closer to the one side, in the travel direction, of the wheel-side vehicle body, and other-side wheels, which are located closer to the other side, in the travel direction, of the wheel-side vehicle body, while controlling brake-force distribution between brake forces of the one-side wheels and the other-side wheels in such a manner that the brake-force distribution becomes a set brake-force distribution based on ideal brake-force distribution characteristics; and a switching unit configured to change the set brake-force distribution in accordance with the direction of the driver seat detected by the driver-seat-direction detector.

9 Claims, 13 Drawing Sheets

(a)

(b)

(a)

(b)

(a)

(b)

BRAKE EQUIPMENT OF VEHICLE WITH DRIVER SEAT WHOSE DIRECTION IS CHANGEABLE

TECHNICAL FIELD

The present invention relates to a brake equipment and a braking method for a vehicle with a driver seat whose direction is changeable (hereinafter, referred to as "driver-seat-direction changeable vehicle"), the vehicle including: a wheel-side vehicle body which has wheels suspended thereon and is capable of running and stopping by driving and braking these wheels; and a cabin-side vehicle body which has a cabin accommodating the driver seat and is mounted on the wheel-side vehicle body in such a manner as to be capable of turning at least to directions causing the driver seat respectively to face one and the other sides, in a travel direction, of the wheel-side vehicle body. Particularly, the present invention relates to a technique for brake-force distribution control performed by the brake equipment.

BACKGROUND ART

During braking of a vehicle, a load on the vehicle shifts in the forward direction. This load shift increases a load on wheels at the front in the forward direction (front wheels) and decreases a load on wheels at the back in the forward direction (rear wheels). For this reason, in a case where the same brake force is applied to the front and rear wheels, the rear wheels given the smaller wheel load tend to lock up before the front wheels given the larger wheel load (hereinafter, also referred to as "preceding lock-up of the rear wheels").

If the front wheels lock up first, problematic unstableness does not occur in the vehicle's behaviors because the rear wheels at the back in the inertial direction have a grip on the road surface. On the other hand, if the rear wheels lock up first as described above, the vehicle may become unable to exert a sufficient grip in the vehicle width direction. Since the front wheels at the front in the inertial direction have a solid grip on the road surface, there occurs a problem that the vehicle spins about the front wheels, causing unstableness in behaviors thereof.

Moreover, since the front wheels are given a larger wheel load, the application of a larger brake force to the front wheels does not cause the lock up thereof; however, because the rear wheels tend to lock up before the front wheels as described above, the brake force of the front wheels cannot be used to a full extent despite the amount of free brake force left unused. This leads to a lack of brake force of the vehicle as a whole and causes a problem that the driver cannot obtain an expected vehicle deceleration through his/her brake operation.

In view of the above problems, the brake forces are generally distributed to the front and rear wheels in such a way that the brake force may be smaller at the rear wheels, which tend to lock up first, than at the front wheels. In this way, the tendency of the preceding lock-up of the rear wheels may be reduced, solving the unstableness in the vehicle's behaviors attributable to the preceding lock-up of the rear wheels. In addition to this, reducing the tendency of the preceding lock-up of the rear wheels makes it possible to fully use the brake force of the front wheels given a larger wheel load. Hence, the driver can obtain an expected vehicle deceleration through his/her brake operation.

However, the following problems occur if the above brake-force distribution control is applied as it is to a case of moving the vehicle backward.

During braking while moving the vehicle backward, a load on the vehicle shifts in the backward direction. In contrast to the earlier case, this load shift increases the wheel load on wheels at the front in the backward direction (the rear wheels described above) and decreases the wheel load on wheels at the back in the backward direction (the front wheels described above). This creates an unused, free portion in the brake force of the wheels at the front in the backward direction (rear wheels), and makes the wheels at the back in the backward direction (front wheels) tend to lock up first.

If, despite this tendency, the control using the same brake-force distribution as the forward movement is performed, so that the brake force is set smaller for the wheels at the front in the backward direction (rear wheels) than for the wheels at the back in the backward direction (front wheels). The brake forces are distributed to the front and rear wheels in an opposite way to how the weight shifts in the vehicle. Accordingly, the brake force of the wheels at the back in the backward direction (front wheels) becomes far larger than that without the above-described brake-force distribution control. This makes the problem of the preceding lock-up tendency (and therefore unstable behaviors) more severe. In addition, since the brake force of the wheels at the front in the backward direction (rear wheels) cannot be fully used, the problem that a vehicle deceleration the driver expects cannot be obtained becomes more severe as well.

In view of such problems occurring during braking while moving the vehicle backward, there has been proposed a related art such as one described in PL 1, for example. According to this related art, when braking is performed while the vehicle is moving backward, a motor regenerative brake force is applied to the wheels at the front in the backward direction (rear wheels) correspondingly to the increase in the load on these wheels, so that the above problems occurring during the braking in the middle of backward movement may be alleviated.

CITATION LIST

Patent Literature

[PL 1]
Japanese Patent Application Publication No. 2004-312943

SUMMARY OF INVENTION

Technical Problem

Nonetheless, the related art relates to a brake equipment of a vehicle with a driver seat whose direction is fixed, and not to a brake equipment of a driver-seat-direction changeable vehicle.

Moreover, the related art cannot be expected to alleviate the above problems, except when braking is performed for only a small required deceleration, a large motor regenerative brake force can be obtained, and the vehicle has a small ratio between the height of the center of gravity of the vehicle and the wheelbase and thus involves small load shift during braking.

Furthermore, the above-described driver-seat-direction changeable vehicle is one designed to be able to change the direction of the driver seat under the assumption that the vehicle travels in one and the other directions (when viewed from the wheel-side vehicle body side) with substantially equal frequency. Thus, a large deceleration is required for the travel in both of these directions, and braking that satisfies such a requirement needs to be performed. Therefore, the application of the related art to the above-described driver-seat-direction changeable vehicle does not lead to the alleviation of the above problems.

Now, the reason for such an inconvenience will be described in detail. When the required deceleration through a braking operation increases, it is necessary to apply, to the wheels at the front in the forward direction, a brake force that is large enough to use up wheel load increased by load shift. Hence, the maximum motor regenerative brake force and the maximum frictional brake force are required.

However, if the maximum frictional brake force is generated on the wheels at the front in the forward direction, the brake force to be applied to the wheels at the back in the forward direction becomes maximum in the case of moving the vehicle in the opposite direction or backward. Consequently, the distribution ratio of the brake force becomes larger at the back in the forward direction. Such a brake-force distribution causes the wheels at the back in the forward direction to exert a larger frictional brake force than those at the front in the forward direction. As a result, the wheels at the back in the forward direction are more likely to lock up, possibly impairing the stability of the vehicle's behaviors.

In this respect, the frictional brake force at the back may be reduced to secure the stability of the vehicle's behaviors without causing the lock-up of the wheels at the back in the forward direction; however, such a reduction further reduces the frictional brake force at the front as well. Thus, there is a possibility that a sufficient vehicle deceleration cannot be obtained unless the vehicle is equipped with large motors capable of generating regenerative brake forces that are large enough to compensate the reduction of the frictional brake force.

The present invention has been made in view of the above problem. An object of the present invention is to provide a brake equipment of the above-described driver-seat-direction changeable vehicle that is capable of achieving both stableness in the vehicle's behaviors and a required deceleration regardless of whether the vehicle is traveling with its driver seat facing one or the other side in the travel direction.

Solution to Problem

To achieve this object, the brake equipment of the driver-seat-direction changeable vehicle according to an aspect of the present invention has the following configuration.

Firstly, the driver-seat-direction changeable vehicle according to the present invention includes: a wheel-side vehicle body which has wheels suspended thereon and is capable of running and stopping by driving and braking the wheels; and a cabin-side vehicle body which has a cabin accommodating the driver seat and is mounted on the wheel-side vehicle body in such a manner as to be capable of turning at least to directions causing the driver seat respectively to face one and the other sides, in a travel direction, of the wheel-side vehicle body.

A brake equipment of the driver-seat-direction changeable vehicle according to an aspect of the present invention includes: a driver-seat-direction detector configured to detect whether the driver seat is facing the one or the other side, in the travel direction, of the wheel-side vehicle body; a braking unit configured to brake one-side wheels, which are located closer to the one side, in the travel direction, of the wheel-side vehicle body, and other-side wheels, which are located closer to the other side, in the travel direction, of the wheel-side vehicle body, while controlling brake-force distribution between brake forces of the one-side wheels and the other-side wheels in such a manner that the brake-force distribution becomes a set brake-force distribution based on ideal brake-force distribution characteristics; and a switching unit configured to change the set brake-force distribution in accordance with the direction of the driver seat detected by the driver-seat-direction detector.

Advantageous Effect of Invention

According to the brake equipment of the driver-seat-direction changeable vehicle of the present invention, stableness in the vehicle's behaviors and a required deceleration can be achieved at the same time regardless of whether the vehicle is traveling with the driver seat facing the one or the other side in the travel direction. Namely, the preceding lock-up of the rear wheels can be reduced and it became possible to apply, to the wheels at the front in the forward direction, a brake force that is large enough to use up wheel load increased by load shift.

DESCRIPTION OF EMBODIMENTS

Figure 1:
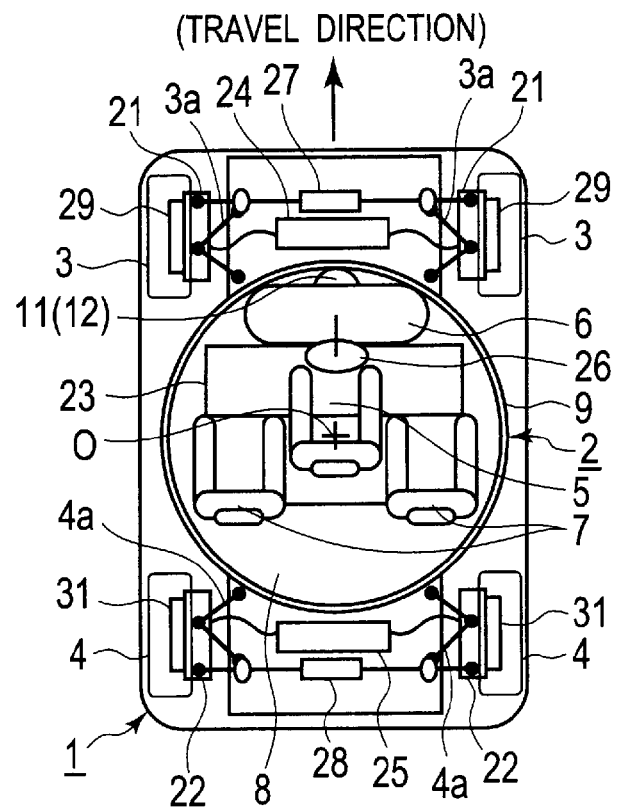
FIG. 1 is a schematic plan view showing an example of a driver-seat-direction changeable vehicle to which a brake equipment of the present invention is applicable.

Hereinbelow, embodiments of the present invention will be described by referring to the drawings.

First Example

Figure 2:
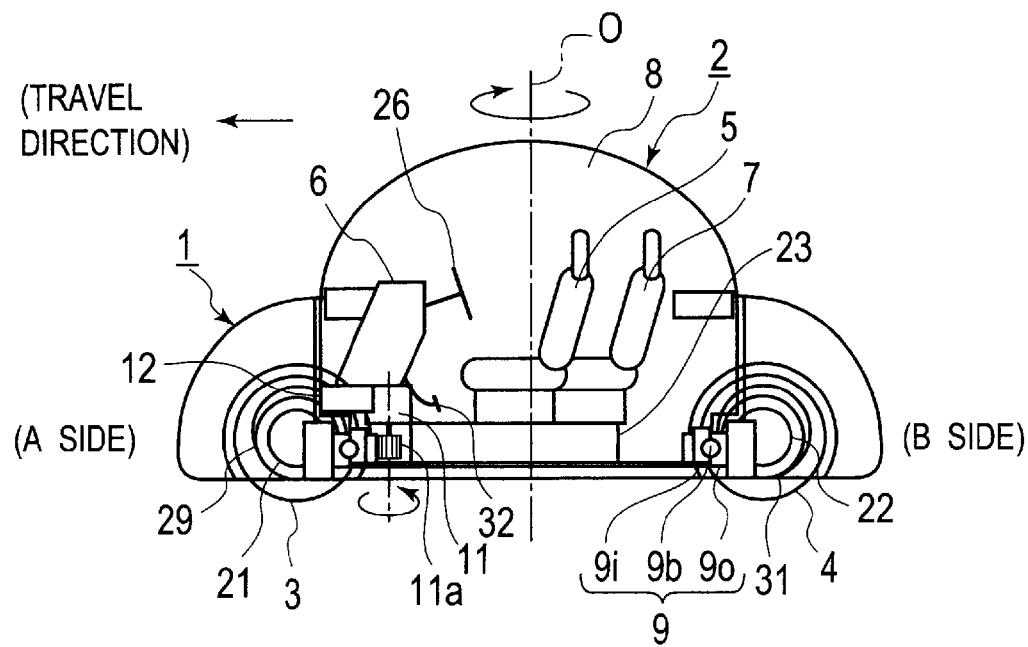
FIG. 2 is a schematic side view of the driver-seat-direction changeable vehicle in FIG. 1.

A driver-seat-direction changeable vehicle to which a brake equipment of the present invention is applicable will be described by referring to FIGS. 1 and 2. The driver-seat-direction changeable vehicle shown in FIGS. 1 and 2 is constituted of a wheel-side vehicle body 1 and a cabin-side vehicle body 2.

On one side of the wheel-side vehicle body 1 in a travel direction, the wheel-side vehicle body 1 includes left and right wheels 3 suspended thereon via respective suspension systems 3a. On the other side of the wheel-side vehicle body 1 in the travel direction, the wheel-side vehicle body 1 includes left and right wheels 4 suspended thereon via respective suspension systems 4a. Through the driving and braking of these wheels 3 and 4, the wheel-side vehicle body 1 can run and stop.

The cabin-side vehicle body 2 includes a domed cabin 8 accommodating a driver seat 5, a cockpit module 6 located frontward of the driver seat, and two passenger seats 7 located obliquely rearward of the driver seat. The cabin-side vehicle body 2 is mounted on the wheel-side vehicle body 1 in such a manner as to be able to rotate about a center vertical line O of the cabin-side vehicle body 2 to change its direction.

A ball bearing 9 is used to mount the cabin-side vehicle body 2 in such a manner. The bearing 9 includes an outer race 9o fixed to the wheel-side vehicle body 1, an inner race 9i fixed to the cabin-side vehicle body 2, and balls 9b interposed between the outer and inner races 9o and 9i.

A directional-change actuator 11, such as a motor, is provided to the cockpit module 6, and a gear 11a coupled to an output shaft of this directional-change actuator 11 is configured to rotate. With this configuration, the cabin-side vehicle body 2 can rotate about the center vertical line O.

The directional-change actuator 11 includes therein a rotational position sensor (not illustrated) configured to detect the rotational position of the cabin-side vehicle body 2. Based on a signal from the rotational position sensor and a signal from a driver-seat-direction command switch (not illustrated), a controller 12 provided to the cockpit module 6 controls the drive of the directional-change actuator 11. The rotational position of the cabin-side vehicle body 2 can be thus shifted in accordance with the command given through the driver-seat-direction command switch, to either a rotational position at which the driver seat faces one side of the wheel-side vehicle body 1 in the travel direction as shown in FIGS. 1 and 2, or a rotational position at which the driver seat faces the other side of the wheel-side vehicle body 1 in the travel direction, which is opposite to what is shown in FIGS. 1 and 2.

Note that the amount of rotation of the cabin-side vehicle body 2 can be set to any amount as long as it can mutually reverse the direction of the driver seat. For example, the cabin-side vehicle body 2 may rotate only by 180 degrees but in two directions, or rotate by 360 degrees.

In the following, a wheel drive part and a wheel brake part of the wheels 3 and 4, which are responsible for the running and stopping of the wheel-side vehicle body 1, will be described.

The wheel drive part is described first. Pairs of wheel drive motors 21 and 22 are coupled to drive shafts of the pairs of wheels 3 and 4, respectively. The wheel drive motors 21 and 22 are mounted on the wheel-side vehicle body 1. Under the control of drive control units 24 and 25 each formed of an inverter and a controller, the respective pairs of wheel drive motors 21 and 22 are driven by receiving electric power from a battery 23 housed underneath the floor of the cabin-side vehicle body 2. The driver-seat-direction changeable vehicle constituted of the wheel-side vehicle body 1 and the cabin-side vehicle body 2 is able to travel by controlling the drive of the wheel drive motors 21 and 22 in this manner. Note that the electric power from the battery 23 is also used to drive the directional-change actuator 11 responsible for the rotation (directional change) of the cabin-side vehicle body 2.

In accordance with a steering command given from a steering wheel 26 provided to the cockpit module 6, the controller 12, which is also provided to the cockpit module 6, steers the pairs of wheels 3 and 4 through corresponding steering actuators 27 and 28 of a steer-by-wire type. The driver-seat-direction changeable vehicle is steered through such an operation during travel.

Next, the wheel brake part will be described. Pairs of frictional brake units 29 and 31, such as drum brakes or disk brakes, are provided to the pairs of wheels 3 and 4 of the wheel-side vehicle body 1, respectively. In accordance with a brake command from a brake pedal 32 provided to the cockpit module 6, the controller 12, which is also provided to the cockpit module 6, hydraulically actuates the frictional brake units 29 and 31 in a brake-by-wire manner. The frictional brake units 29 and 31 perform frictional braking of the wheels 3 and 4 through such an operation.

Figure 3:
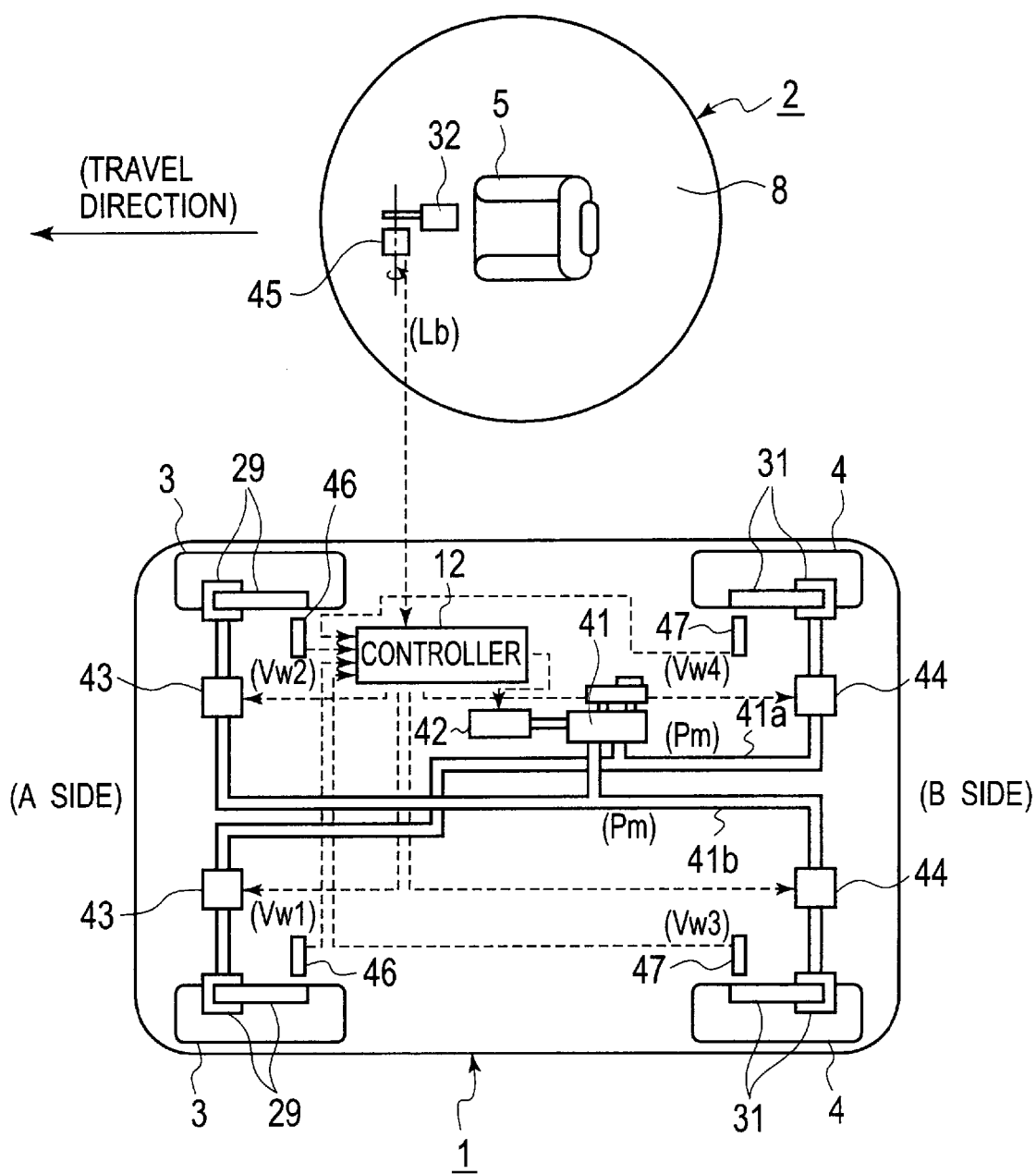
FIG. 3 is a block diagram showing a brake equipment (brake-fluid pressure control system) according to a first example of the present invention.

FIG. 3 shows a brake-fluid pressure control system as an example of a frictional brake system for the wheels 3 and 4. A master cylinder 41 is a hydraulic master cylinder for two lines. When a piston included in the master cylinder 41 is pushed in by a linear actuator 42, the master cylinder 41 outputs a master-cylinder hydraulic pressure Pm corresponding to the amount which the piston pushes in, to one hydraulic brake line 41a and also to the other hydraulic brake line 41b.

The one hydraulic brake line 41a is split into two lines and connected respectively to the frictional brake unit 29 for the left one of the left and right wheels 3 and the frictional brake unit 31 for the right one of the left and right wheels 4.

The other hydraulic brake line 41b is split into two lines and connected respectively to the frictional brake unit 29 for the right one of the left and right wheels 3 and the frictional brake unit 31 for the left one of the left and right wheels 4. Accordingly, obtained is a diagonally-split two-line hydraulic brake system. In order for the brake-fluid pressures for the left and right wheels 3 to be controlled independently from each other, and for the brake-fluid pressures for the left and right wheels 4 to be controlled independently from each other, brake-fluid pressure control units 43 and 44 are installed in each of the hydraulic brake lines 41a and 41b.

These brake-fluid pressure control units 43 and 44 have the same specifications, and so do the frictional brake units 29 and 31. Moreover, the hydraulic brake lines 41a and 41b have the same specifications as well.

The controller 12 is configured to control the actuation of the brake-fluid pressure control units 43 and 44 and the stroke of the linear actuator 42.

The controller 12 receives: a signal from a brake-pedal depression sensor 45 configured to detect an amount Lb of depression of the brake pedal 32 (required deceleration of the vehicle); signals from wheel speed sensors 46 configured to detect rotational speeds Vw1 and Vw2 of the left and right wheels 3, respectively; and signals from wheel speed sensors 47 configured to detect rotational speeds Vw3 and Vw4 of the left and right wheels 4.

Based on the information thus received and some other internal information, the controller 12 controls the direction of the driver seat and the distribution of brake forces in the following manner.

<Control of Direction of Driver Seat>

Figure 4:
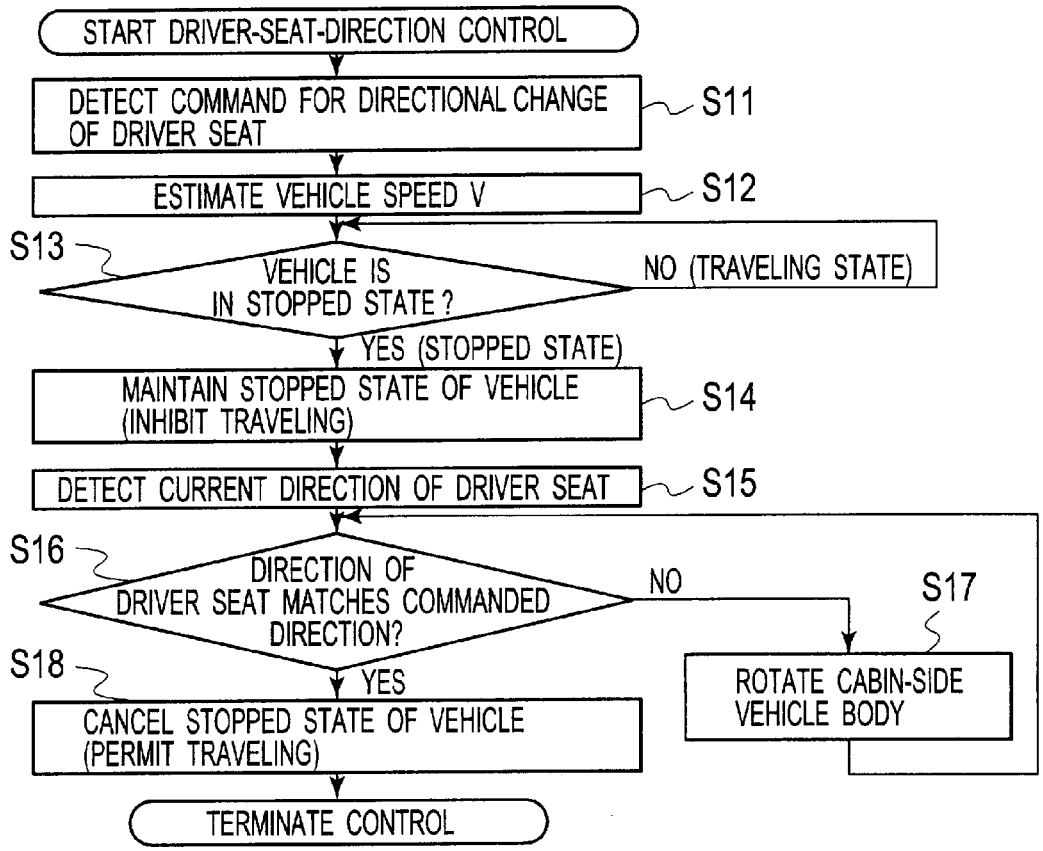
FIG. 4 is a flowchart showing a program to control the direction of the driver seat of the driver-seat-direction changeable vehicle shown in FIGS. 1 and 2.

The controller 12 controls the direction of the driver seat by executing a control program shown in FIG. 4.

In step S11, the controller 12 detects that the driver has given a command to change the direction of the driver seat 5 (i.e., to change the travel direction), on the basis of a signal from the driver-seat-direction command switch. Until a command for the directional change of the driver seat 5 is given, the controller 12 does not execute step S11 and waits for the command.

When the command for the directional change of the driver seat 5 is given and step S11 is executed, the controller 12 proceeds to step S12 and estimates a vehicle speed V by using the rotational speeds Vw1, Vw2, Vw3, and Vw4 of the respective wheels 3 and 4.

In step S13, based on the estimated vehicle speed V, the controller 12 checks whether or not the driver-seat-direction changeable vehicle is in a stopped state. If determining that the driver-seat-direction changeable vehicle is in a traveling state, the controller 12 does not change the direction of the driver seat 5 and maintains the current direction. On the other hand, if determining that the driver-seat-direction changeable vehicle is in a stopped state (YES in S 13), then in step S14, the controller 12 inhibits the vehicle from traveling and holds the vehicle in the stopped state. Then, the controller 12 controls the directional change of the driver seat in the following manner.

In step S15, the controller 12 detects the current direction of the driver seat 5 on the basis of the rotational position of the directional-change actuator 11 that rotates the cabin-side vehicle body 2. In the subsequent step S16, the controller 12 checks whether or not the current direction of the driver seat 5 thus detected matches the commanded direction of the driver seat detected in step S11.

If determining in step S16 that the current direction of the driver seat 5 does not match the commanded direction of the driver seat, then in step S17, the controller 12 drives the directional-change actuator 11 to rotate the cabin-side vehicle body 2 about the center vertical line O.

On the other hand, if the direction of the driver seat 5 matches the commanded direction of the driver seat which the driver desires, the controller 12 ceases the drive of the directional-change actuator 11. Accordingly, the rotational position of the cabin-side vehicle body 2 can be maintained at such a rotational position that the direction of the driver seat 5 matches the commanded direction of the driver seat which the driver desires.

In step S18, the controller 12 cancels the inhibition of the travel of the vehicle, which is set in step S14, and permits the travel of the vehicle. Accordingly, the vehicle can travel with the direction of the driver seat 5 matching the commanded direction of the driver seat which the driver desires.

<Control of Brake-Force Distribution>

The controller 12 moves the linear actuator 42 by an amount corresponding to the amount Lb of brake-pedal depression. As a result, the piston in the master cylinder 41 is pushed in, so that a corresponding master-cylinder hydraulic pressure Pm is outputted from the master cylinder 41. At the same time, the controller 12 executes a control program shown in FIG. 5 to control the distribution of brake forces to the front and rear wheels.

In step S21, the controller 12 detects the amount Lb of brake-pedal depression and the vehicle's state. This "vehicle's state" includes the direction of the driver seat 5 controlled as described in FIG. 4, as well as the rotational speeds Vw1, Vw2, Vw3, and Vw4 of the respective wheels 3 and 4.

Figure 6:
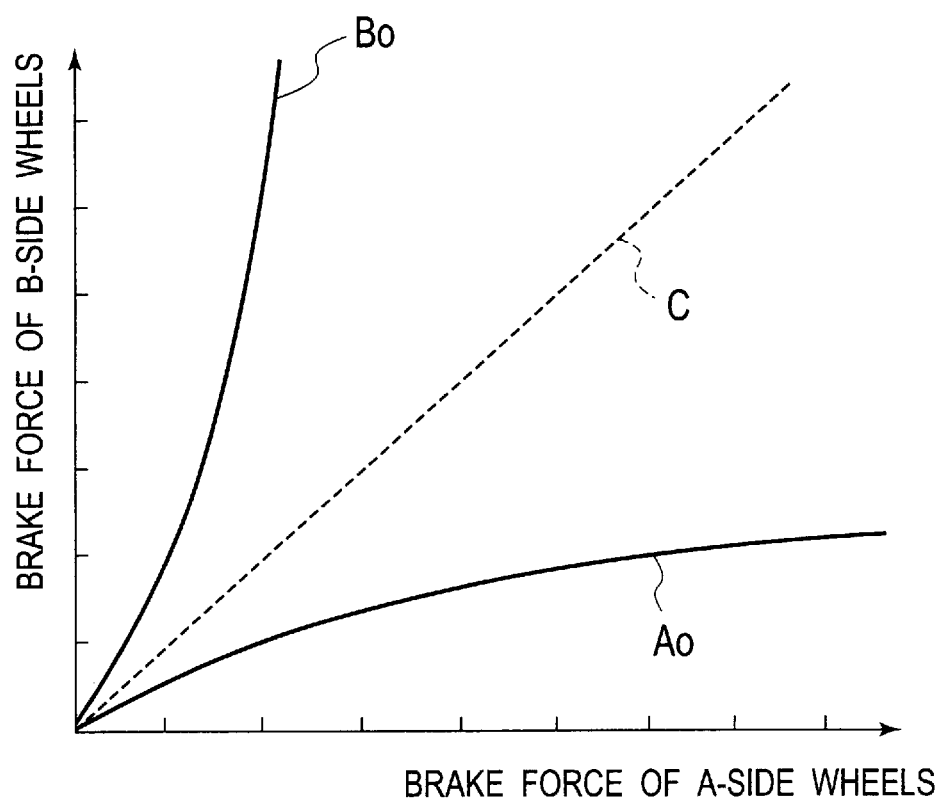
FIG. 6 is a graph showing the characteristics of an ideal brake-force distribution for each travel direction of the driver-seat-direction changeable vehicle, accompanied with the characteristics of a 50:50 brake-force distribution given as a reference.

In the subsequent step S22, the controller 12 calculates a target front-rear brake-force distribution on the basis of ideal brake-force distribution characteristics indicated by Ao or Bo in FIG. 6 corresponding to the current direction of the driver seat 5.

The ideal brake-force distribution characteristics indicated by Ao in FIG. 6 assumes a case where the driver seat 5 is facing one side (A side) in the travel direction and refer to such brake-force distribution characteristics between the A-side wheels 3 and the B-side wheels 4 that the A-side wheels 3 and the B-side wheels 4 can lock up simultaneously. In the case where the driver seat 5 is facing the one side (A side) in the travel direction, the driver has set the driver seat to face one side (A side) in the travel direction as shown in FIGS. 1 to 3 and drives the vehicle in such a direction that the wheels 3 serve as the front wheels and the wheels 4 on the opposite side (B side) serve as the rear wheels.

Meanwhile, the ideal brake-force distribution characteristics indicated by Bo assumes a case where the driver seat 5 is facing the other side (B side) in the travel direction and refer to such brake-force distribution characteristics between the B-side wheels 4 and the A-side wheels 3 that the B-side wheels 4 and the A-side wheels 3 can lock up simultaneously. In the case where the driver seat 5 is facing the other side (B side) in the travel direction, the driver has set the driver seat to face the other side in the travel direction, which is shown as the B side in FIGS. 1 to 3, and drives the vehicle in such a direction that the wheels 4 serve as the front wheels and the wheels 3 on the opposite side (A side) serve as the rear wheels, i.e., a direction opposite to the above-described direction.

Thus, each of the ideal brake-force distribution characteristics Ao and Bo are so set that: when a load shifts forward in the travel direction during braking, the tendency of the preceding lock-up of the rear wheels can be eliminated to maintain the stability of the vehicle's behaviors; and a required vehicle deceleration can be generated by using up the achievable brake force of the front wheels that increases along with the increase in the wheel load thereon.

A front-wheel brake force Bf of the wheels at the front in the travel direction and a rear-wheel brake force Br of the wheels at the back in the travel direction that exist on the ideal brake-force distribution characteristic lines Ao and Bo can be calculated from the following respective formulae (1) and (2):

$$Bf=(ARP/G)\{Wfo+W^*(ARP/G)^*(h/L)\} \quad (1)$$

$$Br=(ARP/G)\{Wro-W^*(ARP/G)^*(h/L)\} \quad (2)$$

where ARP represents the required deceleration (a positive value) for the vehicle, G represents the gravitational acceleration, L represents the vehicle's wheelbase, h represents the height of the center of gravity of the vehicle, W represents the vehicle's weight, Wfo represents the wheel load applied to the wheels at the front in the travel direction while the vehicle is in a stationary state, and Wro represents the wheel load applied to the wheels at the back in the travel direction while the vehicle is in a stationary state.

Note that brake-force distribution characteristics between the A-side wheels 3 and the B-side wheels 4 indicated by C in FIG. 6 are 50:50 brake-force distribution characteristics simply given as a reference. This 50:50 brake-force distribution characteristics can be obtained, for example, by maintaining the brake-fluid pressure control units 43 and 44 in FIG. 3 in an unactuated state and supplying the master-cylinder hydraulic pressures Pm, which are the same between the two hydraulic brake lines, to the frictional brake units 29 and 31 as they are. Alternatively, the 50:50 brake-force distribution characteristics can be obtained by setting the brake-fluid pressure control units 43 and 44 to the same actuated state and setting the brake-fluid pressures for the frictional brake units 29 and 31 to the same level. As a matter of course, the ideal brake-force distribution characteristics Ao and Bo are symmetric with respect to the line of the 50:50 brake-force distribution characteristics.

Figure 5:
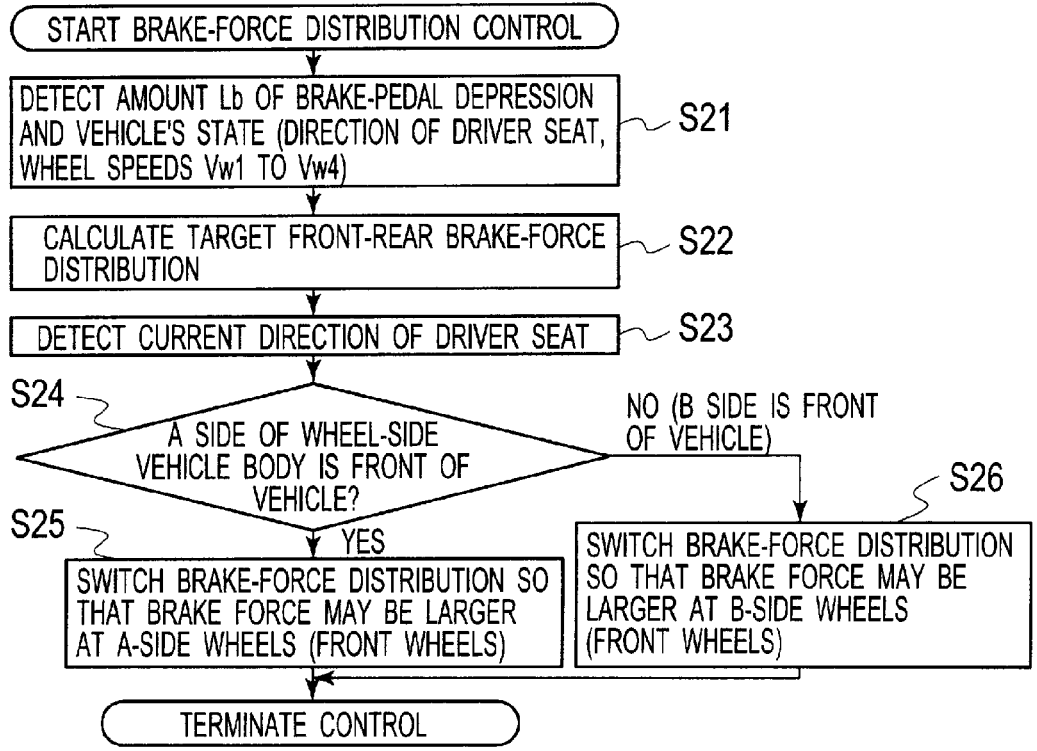
FIG. 5 is a flowchart showing a program executed by a controller 12 shown in FIG. 3 to control the distribution of brake forces.

In step S22 in FIG. 5, to calculate the target front-rear brake-force distribution, the controller 12 determines, on the basis of the current direction of the driver seat, whether the vehicle is traveling with the one side (A side) or the other side (B side) thereof in the travel direction as the front.

If the A side is the front, the controller 12 sets, as the target brake-force distribution, a brake-force distribution in which the brake force is larger at the A-side wheels (front wheels) 3 than at the B-side wheels (rear wheels) 4 in a way to match or resemble the ideal brake-force distribution characteristics indicated by Ao in FIG. 6.

If the B side is the front, the controller 12 sets, as the target brake-force distribution, a brake-force distribution in which the brake force is larger at the B-side wheels (front wheels) 4 than at the A-side wheels (rear wheels) 3 in a way to match or resemble the ideal brake-force distribution characteristics indicated by Bo in FIG. 6.

In step S23, the controller 12 detects the current direction of the driver seat 5 on the basis of the rotational position of the directional-change actuator 11 that rotates the cabin-side vehicle body 2. Thus, step S23 corresponds to the driver-seat-direction detecting means and the driver-seat-direction detector of the present invention.

In the subsequent step S24, based on the detected current direction of the driver seat 5, the controller 12 determines whether or not the travel direction is one in which the A side of the wheel-side vehicle body 1 is the front of the vehicle.

The controller 12 proceeds to step S25 if determining in step S24 that the driving direction is one in which the A side of the wheel-side vehicle body 1 is the front of the vehicle. In step S25, the controller 12 actuates the brake-fluid pressure control units 43 and 44 in FIG. 3 in such a way that the brake-force distribution may become the target brake-force distribution calculated in step S22, i.e., that the brake force may be greater at the A-side wheels (front wheels) 3 than at the B-side wheels (rear wheels) 4 in a way to match or resemble the ideal brake-force distribution characteristics indicated by Ao in FIG. 6.

The controller 12 proceeds to step S26 if determining in step S24 that the driving direction is not one in which the A side of the wheel-side vehicle body 1 is the front of the vehicle, i.e., if determining that the driving direction is one in which the B side of the wheel-side vehicle body 1 is the front of the vehicle. In step S26, the controller 12 actuates the brake-fluid pressure control units 43 and 44 in FIG. 3 in such a way that the brake-force distribution may become the target brake-force distribution calculated in step S22, i.e., that the brake force may be greater at the B-side wheels (front wheels) 4 than at the A-side wheels (rear wheels) 3 in a way to match or resemble the ideal brake-force distribution characteristics indicated by Bo in FIG. 6.

Thus, step S24 corresponds to the switching means and the switching unit of the present invention. Steps S25 and S26 correspond to the braking means and the braking unit of the present invention.

Advantageous Effects of First Example

According to the brake-force distribution control described above, it is possible to achieve the following quantitative advantageous effects. Here, using FIGS. 7(*a*) to 8, description will be given by referring to a case where the vehicle travels after the front in the travel direction is switched from the B side to the A side of the wheel-side vehicle body 1 as shown in FIGS. 7(*a*) and 7(*b*).

Figure 7:
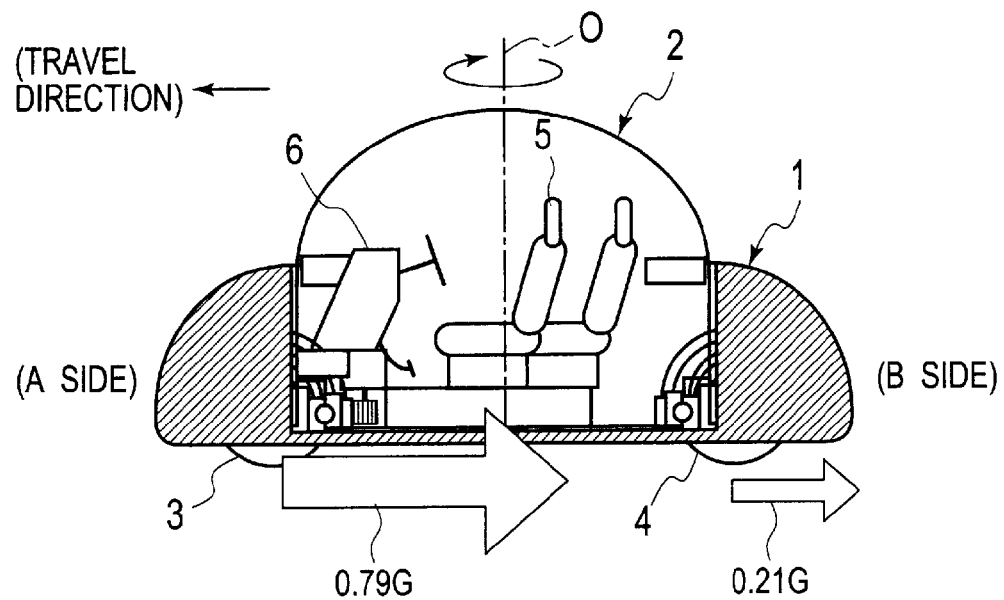
FIG. 7(a) is a diagram describing a result of the brake-force distribution control performed by the brake equipment of the first example.
FIG. 7(b) is a diagram describing a result of brake-force distribution control in a case of applying a conventional concept to the driver-seat-direction changeable vehicle.
Figure 7:
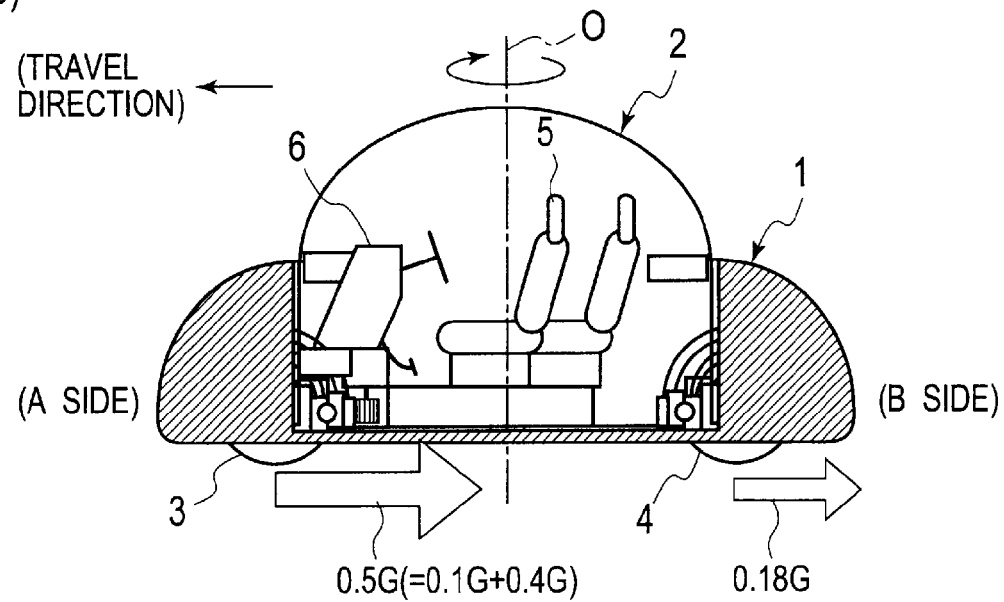
Figure 8:
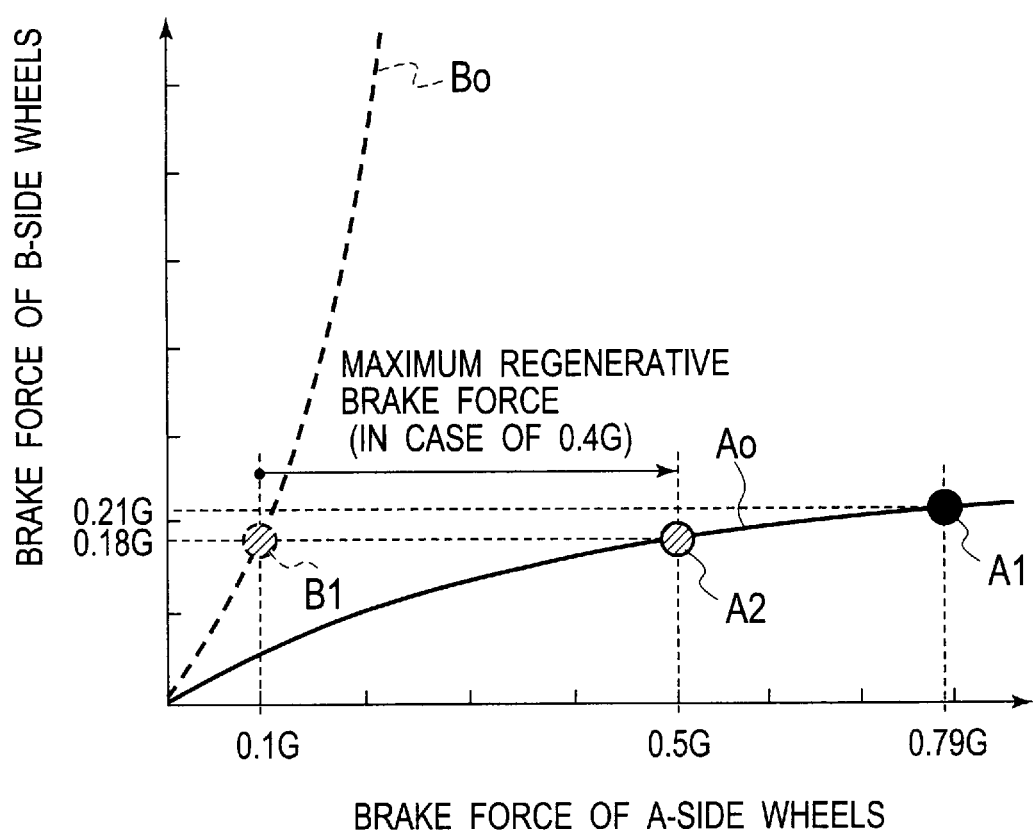
FIG. 8 is a graph showing both the result of the brake-force distribution control by the brake equipment of the first example shown in FIG. 7(a) and the result of the brake-force distribution control of the comparative example shown in FIG. 7(b), in the form of a chart with brake-force distribution characteristic lines.

In a case where the front in the travel direction is switched from the B side to the A side as in FIGS. 7(*a*) and 7(*b*), the brake-force distribution between the A-side wheels 3 and the B-side wheels 4 is switched from a brake-force distribution on a brake-force distribution characteristic line Bo in FIG. 8 corresponding to the ideal characteristic line Bo in FIG. 6, to a brake-force distribution on a brake-force distribution characteristic line Ao in FIG. 8 corresponding to the ideal characteristic line Ao in FIG. 6.

For example, the brake-force distribution may be switched to one at a point A1 on the brake-force distribution characteristic line Ao in FIG. 8. Then, as shown in FIG. 7(*a*), a brake force of 0.79 G is generated at the A-side wheels 3 whereas a brake force of 0.21 G is generated at the B-side wheels 4.

The switching of the brake-force distribution (Bo to Ao) makes the brake force (0.79 G) of the A-side wheels 3 larger than the brake force (0.21 G) of the B-side wheels 4 and hence reverses the magnitude relation therebetween. Accordingly, it is possible to avoid the lock-up of the B-side wheels 4 before the A-side wheels 3 and therefore to avoid unstable behaviors, when load shift occurs during braking and increases the wheel load on the A-side wheels 3 at the front in the travel direction and decreases the wheel load on the B-side wheels 4 at the back in the travel direction.

In addition, since the brake-force distribution is one at the point A1 on the brake-force distribution characteristic line Ao, the generatable brake force of the front wheels 3, which is increased due to the increase in the wheel load thereon, can be used to a full extent. As shown in FIG. 7(*a*), it is possible to obtain 1.0 G (=0.79 G+0.21 G), which is a large required deceleration ARP.

Note that the above advantageous effects can be also obtained when the direction of the driver seat is reversed to switch the front in the travel direction from the A side to the B side. It is obvious that the advantageous effects can be achieved similarly by switching the brake-force distribution between the A-side wheels 3 and the B-side wheels 4 from a brake-force distribution on the brake-force distribution characteristic line Ao in FIG. 8 corresponding to the ideal characteristic line Ao in FIG. 6, to a brake-force distribution on the brake-force distribution characteristic line Bo in FIG. 8 corresponding to the ideal characteristic line Bo in FIG. 6.

Meanwhile, in a case of a driver-seat-direction "fixed" vehicle described in PL 1 with a driver seat whose direction cannot be changed, wheels 4 on a side which the driver seat faces (B-side wheels) always serve as the front wheels. Thus, the brake-fluid pressures should be so controlled that the distribution of the brake forces generated by frictional braking of the B-side wheels 4 and the A-side wheels 3 can always be a brake-force distribution on the brake-force distribution characteristic line Bo in FIG. 8.

For this reason, when braking is performed while the vehicle is moving backward with its A side as the front in the travel direction, the wheel load on the A-side wheels 3 at the front in the backward direction is increased whereas that on the B-side wheels 4 at the back in the backward direction is decreased. Despite this fact, the brake-force distribution remains as one acting in the opposite manner, i.e., one in which the brake force is larger at the B-side wheels 4 than at the A-side wheels 3. Consequently, the problem that the B-side wheels 4 tend to lock up before the A-side wheels 3 (and therefore causes unstable behaviors) becomes more severe than a case without performing brake-force distribution control according to the characteristics Bo. In addition to this, because the generatable brake force of the A-side wheels 3 cannot be fully used, the problem of being unable to achieve the expected vehicle deceleration becomes more severe as well.

With this taken into consideration, description will be now provided below for a comparative example of the first example that employs the aforementioned technique proposed and described in PL 1. In this comparative example of the first example, described is a brake-force distribution in a case where when a vehicle with its A side as the front in the travel direction brakes while traveling, A-side wheels 3 serving as the wheels at the front in the travel direction receive a motor regenerative brake force corresponding to an increase in the load on the A-side wheels 3.

Consider frictional braking at a point B1 on the brake-force distribution characteristic line Bo in FIG. 8. At the point B1, the brake force on the A-side wheels 3 is 0.1 G and the brake force on the B-side wheels 4 is 0.18 G. One feature of the aforementioned technique proposed and described in PL 1 is to apply, to the A-side wheels 3, a motor regenerative brake force corresponding to an increase in the load on the A-side wheels 3 that occurs along with frictional braking. In general, for four-wheel motor-driven electric vehicles, the generatable regenerative brake force at either the A side or the B side may be around 0.4 G at the most.

In view of the stability of the vehicle's behaviors, the brake-force distribution between the A-side wheels 3 and the B-side wheels 4 is so set as to be or resemble one on the ideal brake-force distribution characteristic line Ao. However, as shown in FIG. 8, the brake force of the A-side wheels 3 can be increased from 0.1 G to only about 0.5 G at a point A2 on the ideal brake-force distribution characteristic line Ao, due to the maximum regenerative brake force of 0.4 G.

As a result, the brake force by the A-side wheels 3 is 0.5 G and the brake force by the B-side wheels 4 is 0.18 G as shown in FIG. 7(b). This brake-force distribution exists on the brake-force distribution characteristic line Ao, thereby preventing the preceding lock-up of the B-side wheels 4 (and therefore unstable behaviors). However, the obtainable vehicle deceleration ARP is only about 0.68 G, which is the sum of the brake force 0.5 G of the A-side wheels 3 and the brake force 0.18 G of the B-side wheels 4.

In contrast, according to the first example, when the front in the travel direction is switched from the B side to the A side or from the A side to the B side, the brake-force distribution between the A-side wheels 3 and the B-side wheels 4 is switched to such a brake-force distribution that the brake force is larger at the wheels at the front in the travel direction than at the wheels at the back in the travel direction. Thus, it is possible to avoid the lock-up of the rear wheels before the front wheels and therefore to avoid unstable behaviors, when load shift occurs during braking and increases the wheel load on the wheels at the front in the travel direction and decreases the wheel load on the wheels at the back in the travel direction. In addition, the generatable brake force of the front wheels, which is increased due to the increase in the wheel load thereon, can be used to a full extent. Accordingly, it is possible to obtain a large vehicle deceleration ARP which the driver desires.

Note that as in the case of this example, the brake-fluid pressure control units 43 and 44 have the same specifications, and so do the frictional brake units 29 and 31. Moreover, the hydraulic brake lines 41a and 41b have the same specifications as well. In this way, the fluid pressure control system of the A-side wheel 3 and the fluid pressure control system of the B-side wheel 4 are formed with the same specifications. This makes it possible to achieve the aforementioned advantageous effects by simply switching the brake-force distribution, while achieving a simple configuration of the brake system.

Meanwhile, the driver-seat-direction changeable vehicle is desirably a vehicle whose front and back in the travel direction keep the same weight distribution even if the direction of the driver seat is switched. The application of the brake equipment of the first example to such a driver-seat-direction changeable vehicle allows a simple configuration of control parameters and the like, while achieving the aforementioned advantageous effects.

Second Example

Figure 9:
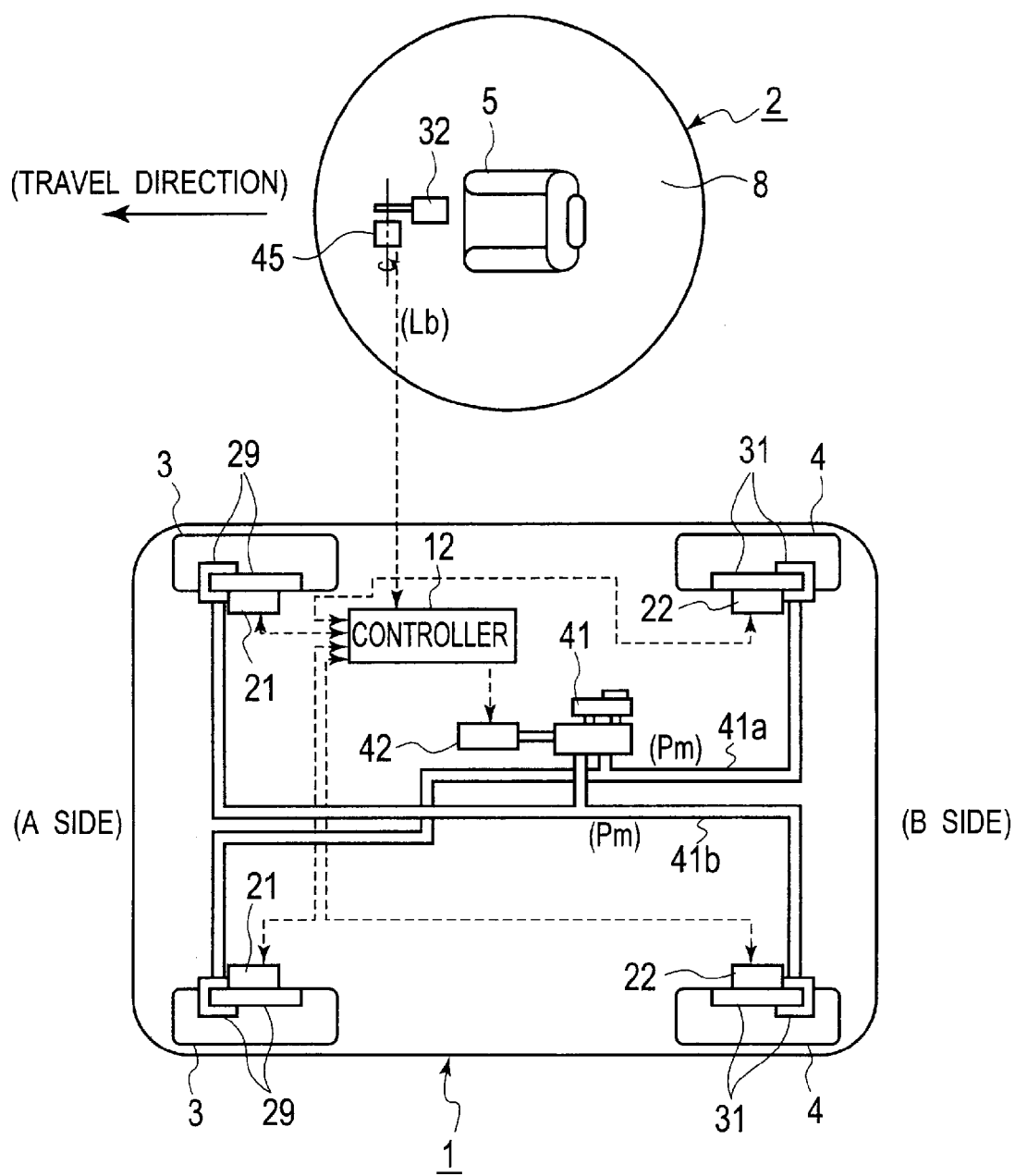
FIG. 9 is a block diagram showing a brake equipment (brake-fluid pressure control system) according to a second example, and corresponds to FIG. 3.
Figure 10:
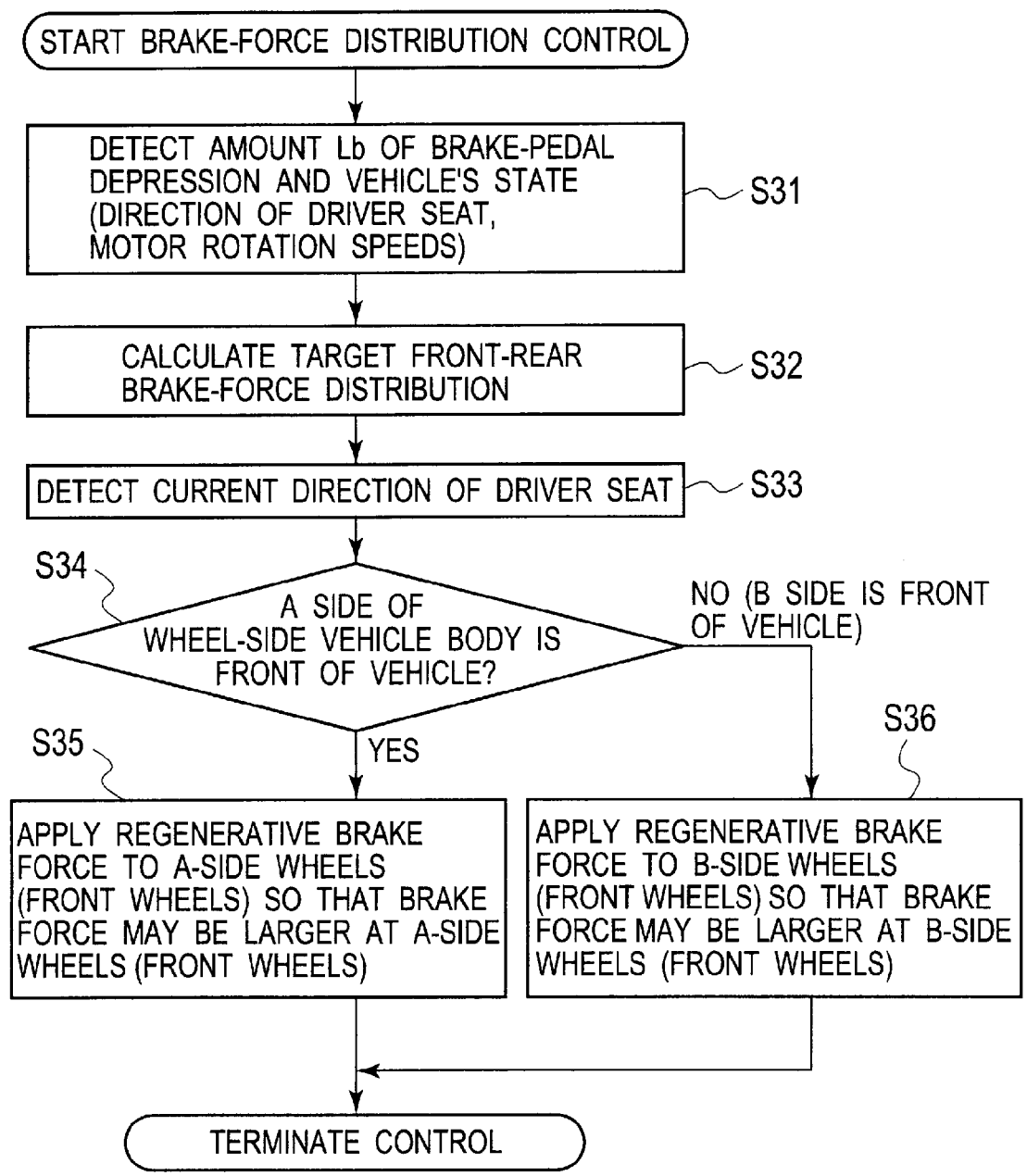
FIG. 10 is a flowchart showing a program executed by a controller 12 shown in FIG. 9 to control the distribution of brake forces, and corresponds to FIG. 5.

FIGS. 9 and 10 show a brake equipment according to a second example. FIG. 9 shows a brake-fluid pressure control system corresponding to FIG. 3; and FIG. 10 is a flowchart showing a program to control the distribution of brake forces, and corresponding to FIG. 5. A driver-seat-direction changeable vehicle of the second example has a similar configuration as that shown in FIGS. 1 and 2. In FIG. 9, the same components as those in FIGS. 1 and 2 are denoted by the same reference signs, and description thereof will be omitted.

As shown in FIG. 9, to achieve a target brake-force distribution and a required vehicle deceleration ARP, the braking of the vehicle is performed always through cooperative control of the frictional braking using the master cylinder 41 and the brake units 29 and 31, as well as regenerative braking using wheel drive motors 21 and 22.

To perform such control, the brake-fluid pressure control units 43 and 44 in FIG. 3 are removed from the hydraulic brake lines 41a and 41b. In this way, the master-cylinder hydraulic pressures Pm, which are the same between the hydraulic brake lines 41a and 41b, are supplied to the frictional brake units 29 and 31 as they are. The frictional brake force of the A-side wheels 3 is therefore always equal to the frictional brake force of the B-side wheels 4. Thus, as to the frictional braking, the brake-force distribution characteristics between the A-side wheels 3 and the B-side wheels 4 appear as indicated by C in FIG. 11, i.e., 50:50 brake-force distribution characteristics as in the case of C in FIG. 6.

In the second example, the regenerative braking by the wheel drive motors 21 and 22 is controlled in cooperation with the control of the frictional braking according to the brake-force distribution characteristic line C, in such a manner that a target brake-force distribution and a required vehicle deceleration ARP can be achieved. To do so, the controller 12 issues a command to assign loads to the wheel drive motors 21 and 22 to generate electric powers corresponding to a certain regenerative brake force so that the wheel drive motors 21 and 22 may operate as generators. Conversely, the controller 12 can issue a command to assign loads to the wheel drive motors 21 and 22 to drive themselves by amounts corresponding to a required drive power so that the wheel drive motors 21 and 22 may operate as motors.

Note that the regenerative brake force control by the wheel drive motors 21 and 22 has higher responsiveness than frictional brake force control, which is hydraulic control; therefore, the brake equipment of the second example is superior to the brake equipment of the aforementioned first example in terms of control responsiveness.

The controller 12 issues a command to assign loads to the wheel drive motors 21 and 22 to generate electric powers simultaneously with the execution of the control of the stroke of the linear actuator 42.

To do so, the controller 12 receives a signal from the brake-pedal depression sensor 45 configured to detect the amount Lb of depression of the brake pedal 32 (required vehicle deceleration) and signals from motor rotational speed sensors (not illustrated) included inside the wheel drive motors 21 and 22 and configured to detect rotational speeds Vm thereof.

Based on the information thus received and some other internal information, the controller 12 performs driver-seat-direction control and brake-force distribution control. The former, or the driver-seat-direction control, is the same as the one described in FIG. 4, and therefore description thereof will be omitted here.

<Control of Brake-Force Distribution>

The controller 12 moves the linear actuator 42 by an amount corresponding to the amount Lb of brake-pedal depression to thereby output a corresponding master-cylinder hydraulic pressure Pm from the master cylinder 41. As a result, the wheels 3 and 4 are subjected to frictional braking to follow the brake-force distribution characteristic line C in FIG. 11. At the same time, the controller 12 executes a control program shown in FIG. 10 to control the brake-force distribution.

In step S31 in FIG. 10, the controller 12 detects the amount Lb of brake-pedal depression and the vehicle's state. This "vehicle's state" includes the direction of the driver seat controlled as described in FIG. 4, as well as the rotational speeds Vm of the respective wheel drive motors 21 and 22.

In the subsequent step S32, the controller 12 calculates a target front-rear brake-force distribution on the basis of ideal brake-force distribution characteristics indicated by Ao or Bo in FIG. 6 corresponding to the current direction of the driver seat.

In step S32, to calculate the target front-rear brake-force distribution, the controller 12 determines, on the basis of the current direction of the driver seat, whether the vehicle is traveling with the one side (A side) or the other side (B side) thereof in the travel direction as the front.

If the A side is the front, the controller 12 sets, as the target brake-force distribution, a brake-force distribution in which the brake force is larger at the A-side wheels (front wheels) 3 than at the B-side wheels (rear wheels) 4 in a way to match or resemble the ideal brake-force distribution characteristics indicated by Ao in FIG. 6.

If the B side is the front, the controller 12 sets, as the target brake-force distribution, a brake-force distribution in which the brake force is larger at the B-side wheels (front wheels) 4 than at the A-side wheels (rear wheels) 3 in a way to match or resemble the ideal brake-force distribution characteristics indicated by Bo in FIG. 6.

In step S33, the controller 12 detects the current direction of the driver seat 5 on the basis of the rotational position of the directional-change actuator 11 that rotates the cabin-side vehicle body 2.

Thus, step S33 corresponds to the driver-seat-direction detecting means and the driver-seat-direction detector of the present invention.

In the subsequent step S34, based on the detected current direction of the driver seat 5, the controller 12 determines whether or not the travel direction is one in which the A side of the wheel-side vehicle body 1 is the front of the vehicle.

The controller 12 proceeds to step S35 if determining in step S34 that the driving direction is one in which the A side of the wheel-side vehicle body 1 is the front of the vehicle. In step S35, the controller 12 issues a command to assign loads to the wheel drive motors 21 of the A-side wheels 3 to generate electric powers equivalent to a certain regenerative brake force and applies the regenerative brake force to the A-side wheels (front wheels) 3. As a result, the brake-force distribution between the front and rear wheels becomes the target brake-force distribution calculated in step S32. In other words, the brake force becomes larger at the A-side wheels (front wheels) 3 than at the B-side wheels (rear wheels) 4 so that the brake-force distribution may match or resemble the ideal brake-force distribution characteristics indicated by Ao in FIG. 6. Here, the brake force of the A-side wheels (front wheels) 3 is the sum of the frictional brake force described above and the regenerative brake force.

Meanwhile, the controller 12 compares the target regenerative brake force to be applied to the A-side wheels (front wheels) 3 with the maximum regenerative brake force which the wheel drive motors 21 can generate. If the target regenerative brake force is larger than the maximum regenerative brake force, the controller 12 sets the regenerative brake force, which is to be applied to the A-side wheels (front wheels) 3, to that generatable maximum regenerative brake force, and issues a command to assign loads to the wheel drive motors 21 of the A-side wheels 3 to generate electric powers equivalent to the generatable maximum regenerative brake force.

The controller 12 proceeds to step S36 if determining in step S34 that the driving direction is not one in which the A side of the wheel-side vehicle body 1 is the front of the vehicle, i.e., if determining that the driving direction is one in which the B side of the wheel-side vehicle body 1 is the front of the vehicle. In step S36, the controller 12 issues a command to assign loads to the wheel drive motors 22 of the B-side wheels 4 to generate electric powers equivalent to a certain regenerative brake force, and applies the regenerative brake force to the B-side wheels (front wheels) 4. As a result, the brake-force distribution between the front and rear wheels becomes the target brake-force distribution calculated in step S32. In other words, the brake force is larger at the B-side wheels (front wheels) 4 than at the A-side wheels (rear wheels) 3 so that the brake-force distribution may match or resemble the ideal brake-force distribution characteristics indicated by Bo in FIG. 6. The brake force of the B-side wheels (front wheels) 4 is the sum of the frictional brake force described above and the regenerative brake force.

Meanwhile, the controller 12 compares the target regenerative brake force to be applied to the B-side wheels (front wheels) 4 with the maximum regenerative brake force which the wheel drive motors 22 can generate. If the target regenerative brake force is larger than the maximum regenerative brake force, the controller 12 sets the regenerative brake force, which is to be applied to the B-side wheels (front wheels) 4, to the generatable maximum regenerative brake force, and issues a command to assign loads to the wheel drive motors 22 of the B-side wheels (front wheels) 4 to generate electric powers equivalent to the generatable maximum regenerative brake force.

Thus, step S34 corresponds to the switching means and the switching unit of the present invention. Steps S35 and S36 correspond to the braking means and the braking unit of the present invention.

Advantageous Effects of Second Example

According to the brake-force distribution control of the second example described above, it is possible to achieve the following advantageous effects.

Specifically, the frictional brake forces, i.e., the brake-fluid pressures no longer need to be controlled, and the same advantageous effects as the first example can be obtained by controlling the loads to be assigned to the motors 21 and 22 for the electrical power generation, i.e., by controlling the regenerative brake forces of the motors 21 and 22. Accordingly, the system can be made simpler. Moreover, since the regenerative brake force control is higher in responsiveness and accuracy than the frictional brake force control, the responsiveness of the brake-force distribution control and the control accuracy thereof can be improve drastically.

Figure 11:
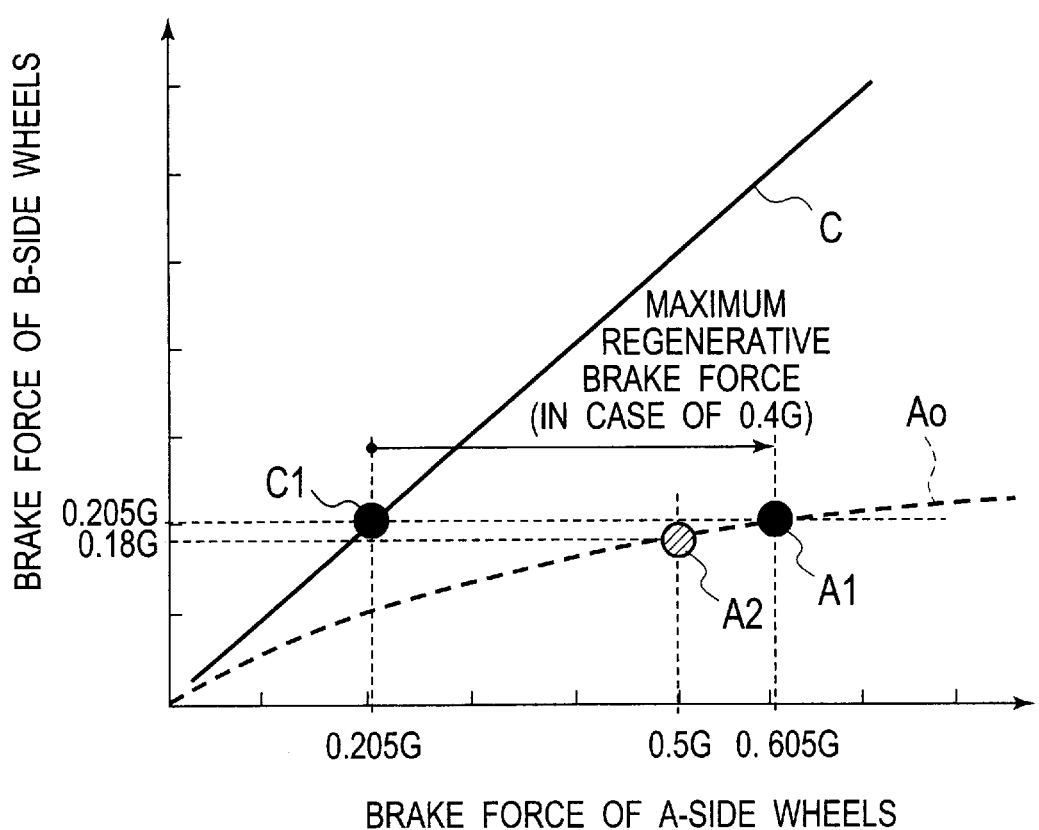
FIG. 11 is a graph showing both a result of the brake-force distribution control by the brake equipment of the second example and a result of brake-force distribution control in a case of applying a conventional concept to the driver-seat-direction changeable vehicle, in the form of a chart with brake-force distribution characteristic lines.
Figure 12:
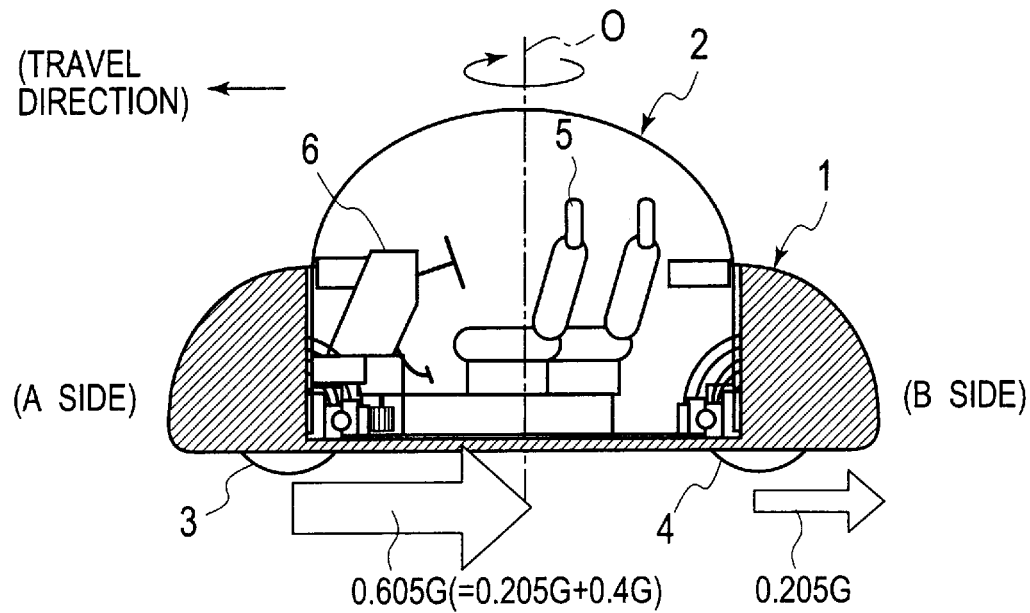
FIG. 12(a) is a diagram describing a result of the brake-force distribution control performed by the brake equipment of the first example.
FIG. 12(b) is a diagram describing a result of brake-force distribution control in a case of applying a conventional concept to the driver-seat-direction changeable vehicle.
Figure 12:
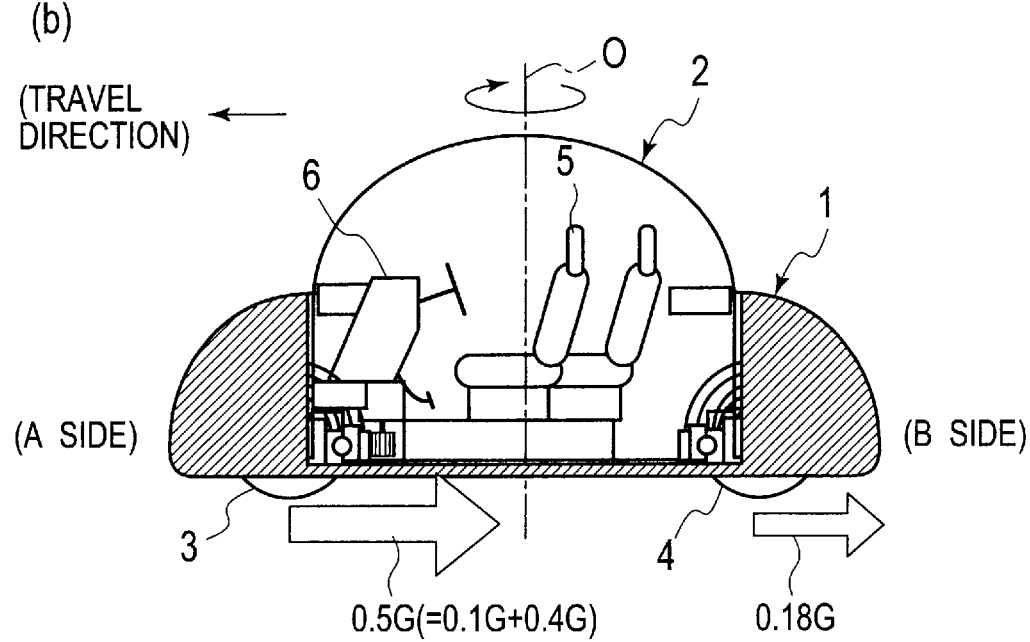

Moreover, according to the brake-force distribution control of the second example, it is possible to achieve the following quantitative advantageous effects in a case where the vehicle travels after the front thereof in the travel direction is switched from the B side to the A side of the wheel-side vehicle body 1 as shown in FIGS. 12(a) and 12(b). Such advantageous effects will be described using FIGS. 11 to 12(b).

Specifically, when the front in the travel direction is switched from the B side to the A side as shown in FIGS. 12(a) and 12(b), the brake-force distribution between the A-side wheels 3 and the B-side wheels 4 is switched from a brake-force distribution on a brake-force distribution characteristic line (omitted in FIG. 11) corresponding to Bo in FIG. 6 to a brake-force distribution on a brake-force distribution characteristic line Ao in FIG. 11 corresponding to Ao in FIG. 6.

Consider a case of braking at, for example, a point C1 (the frictional brake force of the A-side wheels 3=0.205 G; the frictional brake force of the B-side wheels 4=0.205 G,) on the frictional brake-force distribution characteristic line C. In this case, the maximum regenerative brake force of, for example, 0.4 G is added to the frictional brake force (0.205 G) of the A-side wheels 3 at the point C1 (step S35), so that the brake-force distribution is set to a point A1 on the brake-force distribution characteristic line Ao in FIG. 11. Then, the brake-force distribution is so switched that a brake force of 0.605 G is generated at the A-side wheels 3 and a brake force of 0.205 G is generated at the B-side wheels 4 as shown in FIG. 12(a).

The switching of the brake-force distribution to the brake-force distribution characteristic line Ao makes the brake force (0.605 G) of the A-side wheels 3 larger than the brake force (0.205 G) of the B-side wheels 4 and hence reverses the magnitude relation therebetween.

Accordingly, it is possible to avoid the lock-up of the B-side wheels 4 before the A-side wheels 3 and therefore to avoid unstable behaviors, when load shift occurs during braking and increases the wheel load on the A-side wheels 3 at the front in the travel direction and decreases the wheel load on the B-side wheels 4 at the back in the travel direction.

In addition, since the brake-force distribution is one at the point A1 on the ideal brake-force distribution characteristic line Ao, the generatable brake force of the front wheels 3, which is increased due to the increase in the wheel load thereon, can be used to a full extent. As shown in FIG. 12(a), it is possible to obtain 0.605 G+0.205 G=0.810 G, which is a large vehicle deceleration ARP.

Note that the above advantageous effects can be also obtained when the direction of the driver seat is reversed to switch the front in the travel direction from the A side to the B side. It is obvious that the advantageous effects can be achieved similarly by switching the brake-force distribution between the A-side wheels 3 and the B-side wheels 4 from a brake-force distribution on the brake-force distribution characteristic line Ao in FIG. 11 corresponding to the ideal characteristic line Ao in FIG. 6, to a brake-force distribution on a brake-force distribution characteristic line (omitted in FIG. 11) corresponding to the ideal characteristic line Bo in FIG. 6.

Meanwhile, consider a case where the aforementioned technique proposed and described in PL 1 is employed, and a motor regenerative brake force, which corresponds to the increase in the load on the A-side wheels 3 serving as the wheels at the front in the travel direction, is applied to the wheels 3 during braking while the vehicle is traveling with the A side as the front in the travel direction (this is referred to as a comparative example of the above-described second example). In this case, the brake-force distribution may become a brake-force distribution at a point A2 (the frictional brake force of the A-side wheels 3=0.5 G; the frictional brake force of the B-side wheels 4=0.18 G) on the brake-force distribution characteristic line Ao in FIG. 11, as mentioned earlier in FIG. 8.

As a result, as shown in FIG. 12(b), the brake force by the A-side wheels 3 is 0.5 G, and the brake force by the B-side wheels 4 is 0.18 G. Since this brake-force distribution exists on the ideal brake-force distribution characteristic line Ao, the preceding lock-up of the B-side wheels 4 (and therefore unstable behaviors) can be prevented.

However, the obtainable vehicle deceleration ARP is only about 0.68 G, which is the sum of the brake force 0.5 G of the A-side wheels 3 and the brake force 0.18 G of the B-side wheels 4.

In contrast, according to the second example, as shown in FIGS. 12(a) and 12(b), when the front in the travel direction is switched from the B side to the A side or from the A side to the B side, the brake-force distribution between the A-side wheels 3 and the B-side wheels 4 is switched to such a brake-force distribution that the brake force may be larger at the wheels at the front in the travel direction than at the wheels at the back in the travel direction, by the addition of the regenerative brake force.

Accordingly, it is possible to avoid the lock-up of the rear wheels before the front wheels and therefore to avoid unstable behaviors, when load shift occurs during braking and increases the wheel load on the wheels at the front in the travel direction and decreases the wheel load on the wheels at the back in the travel direction.

In addition, a large vehicle deceleration ARP can be generated by using the generatable brake force of the front wheels, which is increased due to the increase in the wheel load thereon, as much as possible although it may not be as large as that in the first example.

Note that, as is obvious from the aforementioned formulae (1) and (2), the vehicle deceleration ARP in the second example can be as large as that in the first example, even when the second example is to be applied to a driver-seat-direction changeable vehicle whose center of gravity is low (the height of the center of gravity of the vehicle h described above is small) and whose wheelbase L described above is long.

Third Example

Figure 13:
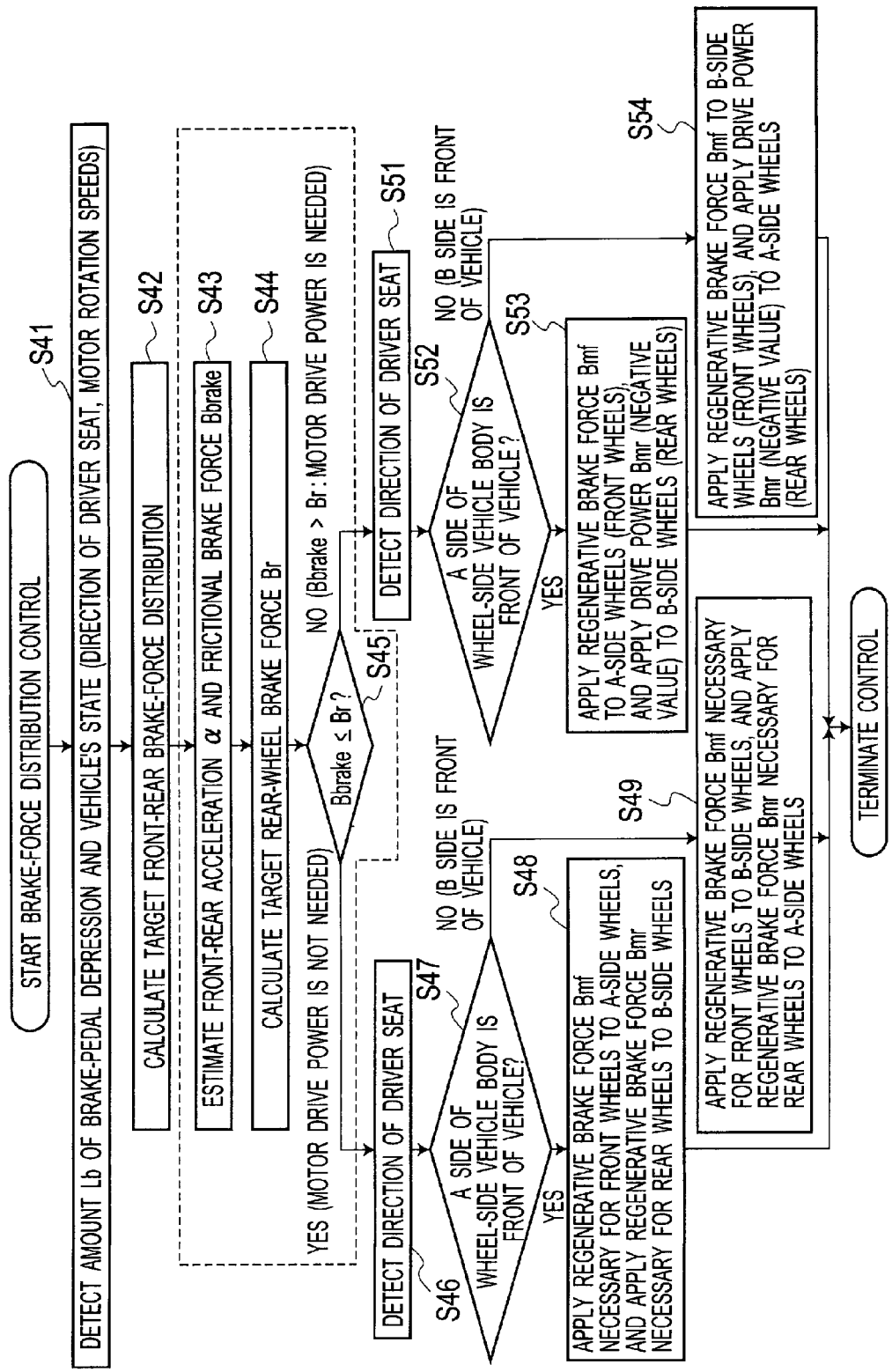
FIG. 13 is a flowchart showing a program executed by a brake equipment according to a third example of the present invention to control the distribution of brake forces, and corresponds to FIGS. 5 and 10.

FIG. 13 is a flowchart showing a program to control the distribution of brake forces of a brake equipment according to a third example, and corresponding to FIGS. 5 and 10.

In the third example, the same driver-seat-direction changeable vehicle described above in FIGS. 1 and 2 is used, and a target brake-force distribution and a required deceleration are achieved by using the same vehicle brake system described above in FIG. 9, i.e., by cooperatively controlling the frictional braking with the master cylinder 41 and the brake units 29 and 31, as well as the regenerative braking with the wheel drive motors 21 and 22.

Incidentally, the controller 12 in the third example shown in FIG. 9 is configured to perform driver-seat-direction control and brake-force distribution control. However, the former, or the driver-seat-direction control, is the same as the one described in FIG. 4, and therefore description thereof will be omitted here.

In the following, by referring to FIGS. 14 to 15(b), description will be provided only for the brake-force distribution control which the controller 12 in FIG. 9 executes in accordance with a control program in FIG. 13.

The controller 12 of FIG. 9 moves the linear actuator 42 for driving the master cylinder by an amount corresponding to the amount Lb of brake-pedal depression to thereby output a corresponding master-cylinder hydraulic pressure Pm from the master cylinder 41. As a result, the wheels 3 and 4 are subjected to frictional braking to follow the brake-force distribution characteristic line C in FIG. 14. At the same time, the controller 12 executes a control program shown in FIG. 13 to control the brake-force distribution.

In step S41 in FIG. 13, the controller 12 detects the amount Lb of brake-pedal depression and the vehicle's state (the direction of the driver seat controlled as described in FIG. 4, as well as the rotational speeds Vm of the respective wheel drive motors 21 and 22).

In the subsequent step S42, the controller 12 calculates a target front-rear brake-force distribution on the basis of ideal brake-force distribution characteristics indicated by Ao or Bo in FIG. 6 corresponding to the current direction of the driver seat.

In step S42, to calculate the target front-rear brake-force distribution, the controller 12 determines, on the basis of the current direction of the driver seat, whether the vehicle is traveling with the one side (A side) or the other side (B side) thereof in the travel direction as the front.

If the A side is the front, the controller 12 sets, as the target brake-force distribution, a brake-force distribution in which the brake force is larger at the A-side wheels (front wheels) 3 than at the B-side wheels (rear wheels) 4 in a way to match or resemble the ideal brake-force distribution characteristics indicated by Ao in FIG. 6.

If the B side is the front, the controller 12 sets, as the target brake-force distribution, a brake-force distribution in which the brake force is larger at the B-side wheels (front wheels) 4 than at the A-side wheels (rear wheels) 3 in a way to match or resemble the ideal brake-force distribution characteristics indicated by Bo in FIG. 6.

In step S43, the controller 12 estimates a required vehicle deceleration ARP on the basis of the amount Lb of break-pedal depression and the rotational speeds Vm of the respective wheel drive motors 21 and 22. By use of the required vehicle deceleration ARP, the controller 12 then calculates and estimates a frictional brake force Bbrake in the following manner.

To calculate the frictional brake force Bbrake, the required vehicle deceleration ARP is first substituted into the aforementioned formula (1). Thereby, a target front-wheel brake force Bf, which exists on the ideal brake-force distribution characteristic line Ao (Bo) in FIG. 6 and used for achieving the required vehicle deceleration ARP, is calculated for the wheels at the front in the travel direction. Then, from this target front-wheel brake force Bf, a maximum regenerative brake force Bmfmax which the wheel drive motors 21 or 22 of the wheels at the front in the travel direction can generate is subtracted, whereby the frictional brake force Bbrake at the front in the travel direction is calculated.

Now, how to calculate the above-described frictional brake force Bbrake will be described using a case where the A side of the wheel-side vehicle body 1 is the front in the travel direction as shown in FIGS. 15(a) and 15(b).

First, the required vehicle deceleration ARP is substituted into the aforementioned formula (1). Thereby, a target front-wheel brake force Bf (e.g., 0.79 G at a point A1 in FIG. 14), which exists on an ideal brake-force distribution characteristic line Ao in FIG. 14 (same as the ideal brake-force distribution characteristic line Ao in FIG. 6) and used for achieving the required vehicle deceleration ARP, is calculated for the wheels at the front in the travel direction (A-side wheels 3). Then, from this target front-wheel brake force Bf, a maximum regenerative brake force Bmfmax (0.4 G in FIG. 14) which the wheel drive motors 21 of the A-side wheels 3 can generate is subtracted, whereby the frictional brake force Bbrake (0.39 G in FIG. 14) of the A-side wheels is calculated.

Figure 14:
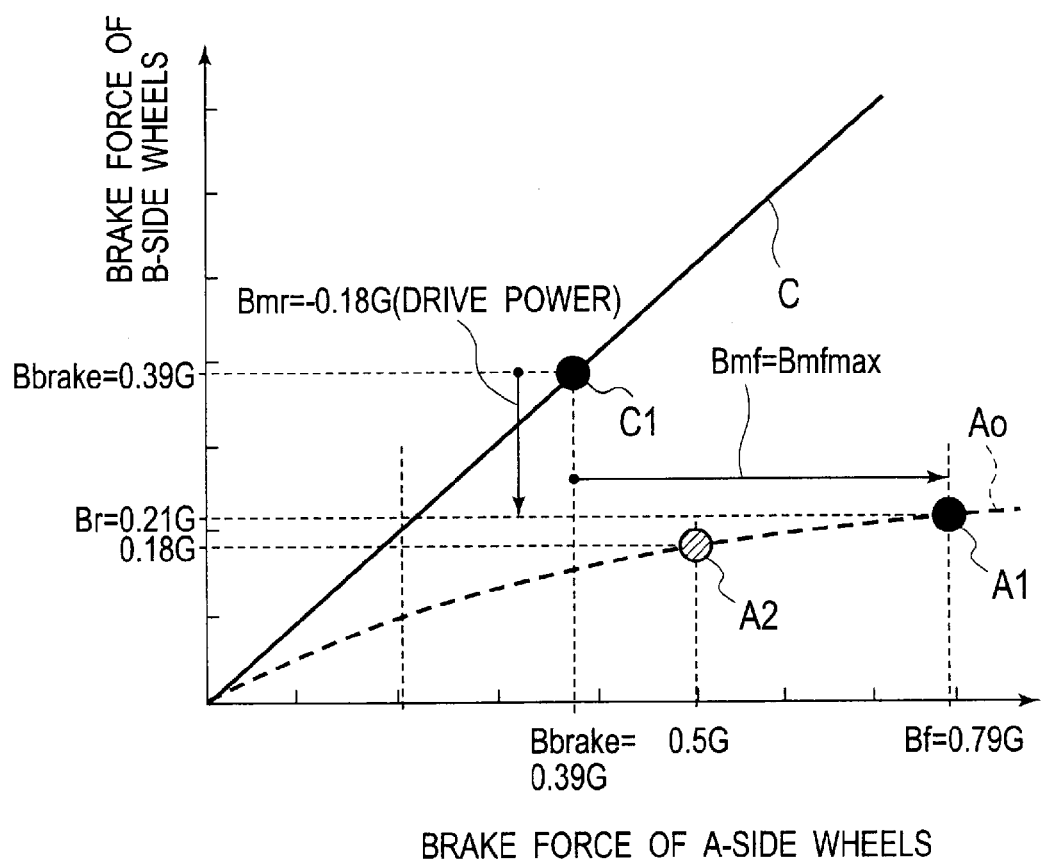
FIG. 14 is a graph showing both a result of the brake-force distribution control by the brake equipment of the third example and a result of brake-force distribution control in a case of applying a conventional concept to the driver-seat-direction changeable vehicle, in the form of a chart with brake-force distribution characteristic lines.

Note that as shown in FIG. 14, the frictional brake force of the B-side wheels at the back in the travel direction also takes a value at a point C1 on the frictional brake-force distribution characteristic line C where Bbrake=0.39 G, and is therefore equal to the frictional brake force Bbrake (0.39 G) of the A-side wheels.

The frictional brake force Bbrake is calculated in the above manner when the target front-wheel brake force Bf is larger than the maximum regenerative brake force Bmfmax as in the case of FIG. 14.

In this case, as described above, the frictional brake force Bbrake is assumed as a result of the subtraction of Bmfmax from Bf, and a regenerative brake force Bmf generated by the front-wheel drive motors 21 or 22 is assumed to be equal to Bmfmax.

On the other hand, when the maximum regenerative brake force Bmfmax is equal to or larger than the target front-wheel brake force Bf, the whole target front-wheel brake force Bf can be handled by means of regenerative braking.

In this case, the frictional brake force Bbrake is assumed to be zero, and the regenerative brake force Bmf generated by the front-wheel drive motors 21 or 22 is assumed to be equal to Bf.

In the subsequent step S44, the controller 12 substitutes the required vehicle deceleration ARP estimated in step S43 into the aforementioned formula (2). Thereby, a target rear-wheel brake force Br, which exists on the ideal brake-force distribution characteristic line Ao (Bo) in FIG. 6 and used for achieving the required vehicle deceleration ARP, is calculated for the wheels at the back in the travel direction.

Thus, step S44 corresponds to the target rear-wheel brake-force calculator of the present invention.

In step S45, through a comparison between the frictional brake force Bbrake calculated in step S43 and the target rear-wheel brake force Br calculated in step S44, the controller 12 checks whether or not the former, or the frictional brake force Bbrake, is larger than the latter, or the target rear-wheel brake force Br.

Now, the comparison between the frictional brake force Bbrake and the target rear-wheel brake force Br will be described using a case where the A side of the wheel-side vehicle body 1 is the front in the travel direction as shown in FIGS. 15(a) and 15(b) and the brake equipment of the third example performs brake-force distribution control at the point A1 on the ideal brake-force distribution characteristic line Ao in FIG. 14.

The comparison is performed by comparing the frictional brake force Bbrake and the target rear-wheel brake force Br on the vertical line (the brake force of the B-side wheels 4) in FIG. 14.

As shown in FIG. 14, Bbrake being larger than Br means that the frictional brake force Bbrake is larger than the target rear-wheel brake force Br at the point A1 on the ideal brake-force distribution characteristic line Ao, and that the brake force at the back in the travel direction (the B-side wheels 4 in the case of FIG. 14) is larger than an instance of the ideal brake-force distribution, thereby making the vehicle's behaviors unstable.

On the other hand, Bbrake being equal to or smaller than Br means that the frictional brake force Bbrake is equal to or smaller than the target rear-wheel brake force Br and that the brake force of the wheels at the back in the travel direction is equal to or smaller than an instance of the ideal brake-force distribution, thereby not making the vehicle's behaviors unstable. However, the above situation also means that the brake force of the rear wheels is not large enough to reach the target value by an amount corresponding to the difference between the frictional brake force Bbrake and the target rear-wheel brake force Br.

Thus, if determining in step S45 that Bbrake is equal to or smaller than Br, the controller 12 causes the control to proceed to steps S46 to S49 to make up for the insufficient brake force of the wheels at the back in the travel direction.

In step S46, the controller 12 detects the direction of the driver seat 5 controlled as described in FIG. 4.

Thus, step S46 corresponds to the driver-seat-direction detector of the present invention.

In the subsequent step S47, based on the detected current direction of the driver seat 5, the controller 12 determines whether or not the driving direction is one in which the A side of the wheel-side vehicle body 1 is the front of the vehicle.

If determining in step S47 that the driving direction is one in which the A side of the wheel-side vehicle body 1 is the front of the vehicle, then in step S48, the controller 12 sets the brake-force distribution in such a way that it may become the target brake-force distribution calculated in step S42, i.e., in such a way that the brake force may be larger at the A-side wheels (front wheels) 3 than at the B-side wheels (rear wheels) 4 so that the brake-force distribution may match or resemble the ideal brake-force distribution characteristics indicated by Ao in FIGS. 6 and 14.

To do so, the controller 12 issues a command to assign loads to the wheel drive motors 21 of the A-side wheels 3 to generate electric powers equivalent to the regenerative brake force Bmf for the front wheels. Then, the regenerative brake force Bmf necessary for the front wheels, which is the maximum regenerative brake force Bmfmax in FIG. 14, is applied to the A-side wheels 3. The brake force Bf of the A-side wheels (front wheels) 3 is the sum of the aforementioned frictional brake force Bbrake and the regenerative brake force Bmf.

In addition, the controller 12 issues a command to assign loads to the wheel drive motors 22 of the B-side wheels 4 to generate electric powers equivalent to the regenerative brake force Bmr for the rear wheels. Then, a positive regenerative brake force Bmr necessary for the rear wheels is applied to the B-side wheels 4. Hence, the brake force Br of the B-side wheels (rear wheels) 4 is the sum of the aforementioned frictional brake force Bbrake and the regenerative brake force Bmr.

The controller 12 proceeds to step S49 if determining that the driving direction is one in which the B side of the wheel-side vehicle body 1 is the front of the vehicle. In step S49, the controller 12 issues a command to assign loads to the wheel drive motors 22 of the B-side wheels 4 to generate electric powers equivalent to the regenerative brake force Bmf for the front wheels. Then, the regenerative brake force Bmf necessary for the front wheels is applied to the B-side wheels 4. Hence, the brake force Bf of the B-side wheels (front wheels) 4 is the sum of the aforementioned frictional brake force Bbrake and the regenerative brake force Bmf. As a result, the brake-force distribution can be set in such a way that it may become the target brake force distribution calculated in step S42, i.e., in such a way that the brake force may be larger at the B-side wheels (front wheels) 4 than at the A-side wheels (rear wheels) 3 so that the brake-force distribution may match or resemble the ideal brake-force distribution characteristics indicated by Bo in FIG. 6.

In addition, the controller 12 issues a command to assign loads to the wheel drive motors 21 of the A-side wheels 3 to generate electric powers equivalent to the regenerative brake force Bmr for the rear wheels. Then, a positive regenerative brake force Bmr necessary for the rear wheels is applied to the A-side wheels 3. Hence, the brake force Br of the A-side wheels (rear wheels) 3 is the sum of the aforementioned frictional brake force Bbrake and the regenerative brake force Bmr.

If determining in step S45 that Bbrake is larger than Br as illustrated in FIG. 14, the controller 12 causes the control to proceed to steps S51 to S54 to eliminate an excess of the brake force of the wheels at the back in the travel direction, as well as unstableness in the vehicle's behaviors due to this excess.

In step S51, the controller 12 detects the direction of the driver seat 5 controlled as described in FIG. 4.

Thus, step S51 corresponds to the driver-seat-direction detecting means and the driver-seat-direction detector of the present invention.

In the subsequent step S52, based on the detected current direction of the driver seat 5, the controller 12 determines whether or not the driving direction is one in which the A side of the wheel-side vehicle body 1 is the front of the vehicle.

The controller 12 proceeds to step S53 if determining that the driving direction is one in which the A side of the wheel-side vehicle body 1 is the front of the vehicle. In step S53, the controller 12 issues a command to assign loads to the wheel drive motors 21 of the A-side wheels 3 to generate electric powers equivalent to the regenerative brake force Bmf for the front wheels. Then, the regenerative brake force Bmf (maximum regenerative brake force Bmfmax in FIG. 14) necessary for the front wheels is applied to the A-side wheels 3. Hence, the brake force Bf of the A-side wheels (front wheels) 3 is the sum of the aforementioned frictional brake force Bbrake and the regenerative brake force Bmf. As a result, the brake-force distribution can be set in such a way that it may become the target brake force distribution calculated in step S42, i.e., in such a way that the brake force may be larger at the A-side wheels (front wheels) 3 than at the B-side wheels (rear wheels) 4 so that the brake-force distribution may match or resemble the ideal brake-force distribution characteristics indicated by Ao in FIGS. 6 and 14.

In addition, the controller 12 issues a command to assign loads to the wheel drive motors 22 of the B-side wheels 4 to drive themselves by an amount equivalent to a motor drive power Bmr necessary for eliminating the excess of the rear-wheel brake force. Then, the motor drive power Bmr (Bmr is a negative value as illustrated in FIG. 14) necessary for eliminating the excess of the rear-wheel brake force and unstableness in the vehicle's behaviors due to the excess is applied to the B-side wheels 4. As illustrated in FIG. 14, the brake force Br of the B-side wheels (rear wheels) 4 is set to a value that is smaller than the aforementioned frictional brake force Bbrake by the motor drive power Bmr.

If determining in step S52 that the driving direction is one in which the B side of the wheel-side vehicle body 1 is the front of the vehicle, then in step S54, the controller 12 sets the brake-force distribution in such a way that it may become the target brake-force distribution calculated in step S42, i.e., in such a way that the brake force may be larger at the B-side wheels (front wheels) 4 than at the A-side wheels (rear wheels) 3 so that the brake-force distribution may match or resemble the ideal brake-force distribution characteristics indicated by Bo in FIG. 6.

To do so, the regenerative brake force Bmf necessary for the front wheels is applied to the B-side wheels 4 (i.e., a command is issued to assign loads to the wheel drive motors 22 of the B-side wheels 4 to generate electric powers equivalent to the regenerative brake force Bmf for the front wheels), so that the brake force Bf of the B-side wheels (front wheels) 4 is set to the sum of the aforementioned frictional brake force Bbrake and the regenerative brake force Bmf.

In addition, the motor drive power Bmr=Br−Bbrake (Bmr is a negative value) necessary for eliminating the excess of the rear-wheel brake force (and unstableness in the vehicle's behaviors due to this excess) is applied to the A-side wheels 3 (i.e., a command is issued to assign loads to the wheel drive motors 21 of the A-side wheels 3 to drive themselves by an amount equivalent to the motor drive power Bmr necessary for eliminating the excess of the rear-wheel brake force), so that the brake force Br of the A-side wheels (rear wheels) 3 is set to a value that is smaller than the aforementioned frictional brake force Bbrake by the motor drive power Bmr.

Thus, the steps S47 and S52 correspond to the switching unit of the present invention, and the steps S48 and S49 as well as the steps S53 and S54 correspond to the braking unit of the present invention.

Advantageous Effects of Third Example

According to the brake-force distribution control of the third example described above, it is possible to achieve the following advantageous effects.

Figure 15:
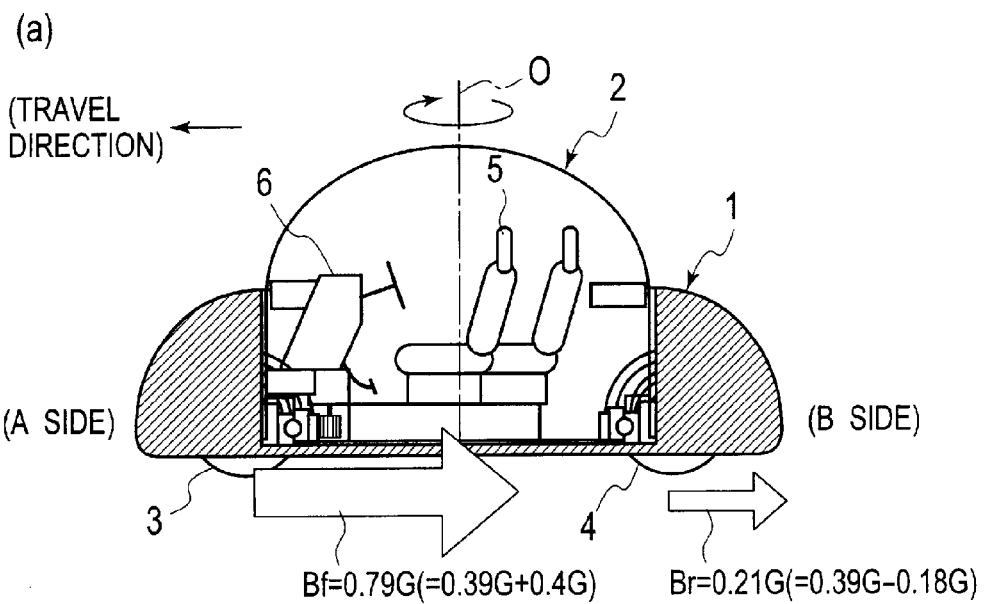
FIG. 15(a) is a diagram describing a result of the brake-force distribution control performed by the brake equipment of the third example.
FIG. 15(b) is a diagram describing a result of brake-force distribution control in a case of applying a conventional concept to the driver-seat-direction changeable vehicle.
Figure 15:
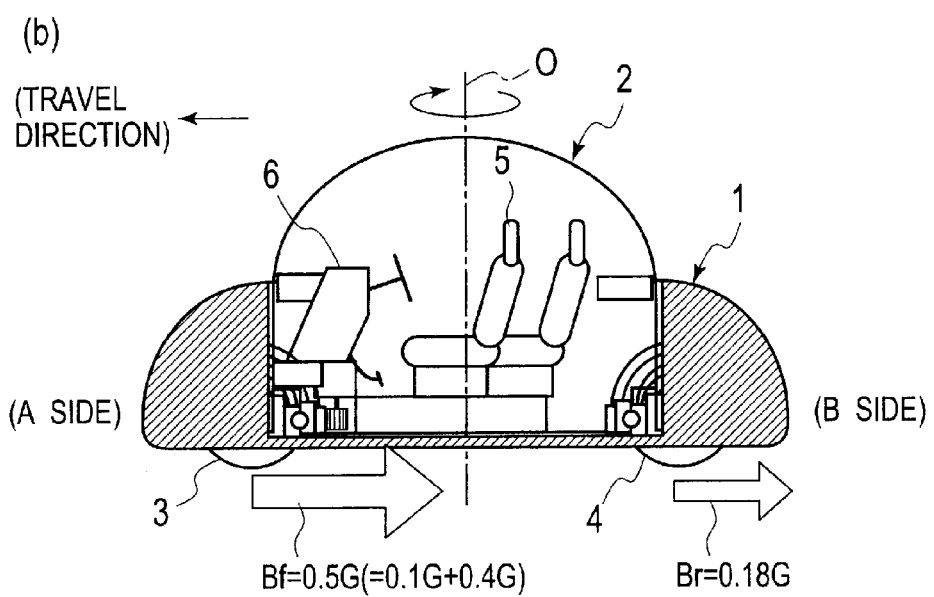

It is possible to achieve the following quantitative advantageous effects in a case where the vehicle travels after the front thereof in the travel direction is switched from the B side to the A side of the wheel-side vehicle body 1 as shown in FIGS. 15(*a*) and 15(*b*). Such advantageous effects will be described using FIGS. 14 to 15(*b*).

Specifically, when the front in the travel direction is switched from the B side to the A side as shown in FIGS. 15(*a*) and 15(*b*), the brake-force distribution between the A-side wheels 3 and the B-side wheels 4 is switched from a brake-force distribution on a brake-force distribution characteristic line (omitted in FIG. 14) corresponding to the ideal characteristic line Bo in FIG. 6 to a brake-force distribution on a brake-force distribution characteristic line Ao in FIG. 11 corresponding to the ideal characteristic line Ao in FIG. 6.

Consider a case of braking at, for example, a point C1 (the frictional brake force of the A-side wheels 3=0.39 G; the frictional brake force of the B-side wheels 4=0.39 G,) on the frictional brake-force distribution characteristic line C. In this case, the regenerative brake force Bmf (maximum regenerative brake force Bmfmax=0.4 G in FIG. 14) is added to the frictional brake force (0.39 G) of the A-side wheels 3 at the point C1. In addition, the motor drive power Bmr (=Br−Bbrake; Bmr=0.18 G in FIG. 14) is added to the frictional brake force (0.39 G) of the B-side wheels 4 at the point C1 (step S53). Accordingly, the brake-force distribution becomes one at the point A1 on the brake-force distribution characteristic line Ao in FIG. 14. Specifically, as shown in FIG. 15(*a*), the A-side wheels 3 generate the brake force Bf=0.79 G, which is the sum of the frictional brake force Bbrake=0.39 G and the regenerative brake force Bmf=0.4 G. The B-side wheels 4 generate the brake force Br=0.21 G, which is the sum of the frictional brake force Bbrake=0.39 G and the motor drive power Bmr=−0.18 G.

The switching of the brake-force distribution to the brake-force distribution characteristic line Ao makes the brake force Bf (0.79 G) of the A-side wheels 3 larger than the brake force Br (0.21 G) of the B-side wheels 4 and hence reverses the magnitude relation therebetween. Accordingly, it is possible to avoid the lock-up of the B-side wheels 4 before the A-side wheels 3 and therefore to avoid unstable behaviors, when load shift occurs during braking and increases the wheel load on the A-side wheels 3 at the front in the travel direction and decreases the wheel load on the B-side wheels 4 at the back in the travel direction.

In addition, since the brake-force distribution is one at the point A1 on the ideal characteristic line Ao, the generatable brake force of the front wheels 3, which is increased due to the increase in the wheel load thereon, can be used to a full extent. As shown in FIG. 15(*a*), it is possible to obtain 0.79 G+0.21 G=1.0 G, which is a large vehicle deceleration ARP.

Note that the above advantageous effects can be also obtained when the direction of the driver seat is reversed to switch the front in the travel direction from the A side to the B side, as a matter of course. Specifically, by performing step S54, the brake-force distribution is switched between the A-side wheels 3 and the B-side wheels 4 from a brake-force distribution on the brake-force distribution characteristic line Ao in FIG. 14 corresponding to the ideal characteristic line Ao in FIG. 6, to a brake-force distribution on a brake-force distribution characteristic line (omitted in FIG. 14) corresponding to the ideal characteristic line Bo in FIG. 6.

Meanwhile, consider a case where the aforementioned technique proposed and described in PL 1 is employed, and a motor regenerative brake force, which corresponds to the increase in the load on the A-side wheels 3 serving as the wheels at the front in the travel direction, is applied to the wheels 3 during braking while the vehicle is traveling with the A side as the front in the travel direction (this is referred to as a comparative example of the third example). In this case, the brake-force distribution may become a brake-force distribution at a point A2 (the frictional brake force of the A-side wheels 3=0.5 G; the frictional brake force of the B-side wheels 4=0.18 G) on the brake-force distribution characteristic line Ao in FIG. 14, as mentioned earlier in FIG. 8.

As a result, as shown in FIG. 15(b), the brake force by the A-side wheels 3 is 0.5 G, and the brake force by the B-side wheels 4 is 0.18 G. Since this brake-force distribution exists on the ideal brake-force distribution characteristic line Ao, the preceding lock-up of the B-side wheels 4 (and therefore unstable behaviors) can be prevented.

However, the obtainable vehicle deceleration ARP is only about 0.68 G, which is the sum of the brake force 0.5 G of the A-side wheels 3 and the brake force 0.18 G of the B-side wheels 4.

In contrast, according to the third example, as shown in FIGS. 15(a) and 15(b), when the front in the travel direction is switched from the B side to the A side or from the A side to the B side, the brake-force distribution between to the A-side wheels 3 and the B-side wheels 4 is switched to such a brake-force distribution that the brake force may be larger at the wheels at the front in the travel direction than at the wheels at the back in the travel direction, by the addition of the regenerative brake force in step S48 or S49 or by the addition of the motor drive power in step S53 or S54.

Accordingly, it is possible to avoid the lock-up of the rear wheels before the front wheels and therefore to avoid unstable behaviors, when load shift occurs during braking and increases the wheel load on the wheels at the front in the travel direction and decreases the wheel load on the wheels at the back in the travel direction.

In addition, a large vehicle deceleration ARP can be generated by fully using the generatable brake force of the front wheels, which is increased due to the increase in the wheel load thereon.

Moreover, in the third example, if the frictional brake force Bbrake is excessive so that the frictional brake force Bbrake by itself locks up the wheels at the back in the travel direction before the wheels at the front in the travel direction (step S45), a motor drive power equivalent to an amount corresponding to such an excess of the brake force is applied to the wheels at the back in the travel direction, instead of a regenerative brake force (steps S53 and S54).

In this way, when braking is to be performed with an excessive frictional brake force Bbrake, the brake force of the wheels at the back in the travel direction can be suppressed down to a level at which the rear wheels do not lock up before the wheels at the front in the travel direction. Thereby, it is possible to avoid the preceding lock-up of the rear wheels and therefore to avoid unstable behaviors.

Furthermore, the brake force of the wheels at the front in the travel direction is so controlled as to be a target front-wheel brake force according to the ideal brake-force distribution characteristics.

Accordingly, the generatable brake force of the front wheels, which is increased due to the increase in the wheel load thereon as a result of load shift during braking, can be used to a full extent, whereby a sufficient vehicle deceleration can be secured.

Thereby, it is possible to secure a sufficient vehicle deceleration and to avoid the preceding lock-up of the rear wheels (therefore to avoid unstableness in the vehicle's behaviors) at the same time at high levels.

Other Examples

In any of the first to third examples described above, as shown in FIGS. 1 and 2, the cabin-side vehicle body 2 is mounted on the wheel-side vehicle body 1 with the bearing 9 interposed therebetween, and thus is made rotatable about the center vertical line O thereof. Moreover, the cabin-side vehicle body 2 is caused to change its direction with the directional-change actuator 11, such as a motor, provided to the cockpit module 6 and via the gear 11a coupled to the output shaft of the directional-change actuator 11.

Note, however, that the mechanism for the directional change of the cabin-side vehicle body 2 is not limited to this and may be one with any structure. Moreover, the directional change of the cabin-side vehicle body 2 is not limited to one performed through two-way (positive and negative) rotation of the cabin-side vehicle body 2. The directional change may be performed through one-way rotation.

In addition, the method of driving the wheels 3 and 4 is not limited to one based on a so-called in-wheel motor type in which the pairs of wheels 3 and 4 are provided with and driven by the respective pairs of wheel drive motors 21 and 22 as shown in FIGS. 1 and 2.

For example, it is possible to employ a wheel drive method in which a single wheel drive motor is provided to the wheel-side vehicle body 1 at each of one and the other sides thereof in the travel direction, and each pair of left and right wheels 3 and 4 on the corresponding side shares and is driven by the single motor on that side.

Alternatively, it is possible to employ a wheel drive method in which all the wheels 3 and 4 are provided with a single common motor, and are driven by this motor via a differential gear and drive shafts.

Further, in the first example, as shown in FIG. 3, the hydraulic brake system is a 4-sensor/4-channel diagonally-split hydraulic brake system in which the brake-fluid pressures to the wheels 3 and 4 are electronically controlled by the units 43 and 44 on the basis of the master-cylinder pressure Pm corresponding to the amount Lb of brake-pedal depression. However, the brake system may be a system with any configuration as long as it is able to control the brake-force distribution between the wheels 3 and 4 on one and the other sides, in the travel direction, of the wheel-side vehicle body 1. For example, the brake system may be a front/rear split hydraulic brake system.

Also, the wheel speed sensors 46 and 47 in the first example shown in FIG. 3 may be replaced with motor rotation sensors configured to detect the rotational speeds of the wheel drive motors 21 and 22, if the method of driving the wheels 3 and 4 is one based on an in-wheel motor type as shown in FIGS. 1 to 3. In this case, it is favorable to install the motor rotation sensors inside the individual wheels 3 and 4, respectively.

The entire contents of a Japanese Patent Application No. P2010-044875 with a filing date of Mar. 2, 2010 are herein incorporated by reference.

Hereinabove, embodiments of the present invention have been described. However, these embodiments are described to facilitate an understanding of the present invention and not to limit the present invention. Therefore, the elements disclosed in the above embodiments encompass all design modifications and equivalents that fall within the technical scope of the present invention.

INDUSTRIAL APPLICABILITY

The present invention is characterized by controlling brake-force distribution between brake forces of the one-side wheels and the other-side wheels in accordance with the direction of the driver seat. According to such an brake equipment and the braking method for the driver-seat-direction changeable vehicle, the stableness in the vehicle's behaviors and a required deceleration can be achieved at the same time regardless of whether the vehicle is traveling with the driver seat facing the one or the other side in the travel direction.

Therefore, the brake equipment and the braking method for the driver-seat-direction changeable vehicle are industrially applicable.

The invention claimed is:

1. A brake equipment of a vehicle with a driver seat whose direction is changeable, the vehicle including: a wheel-side vehicle body which has wheels suspended thereon and is capable of running and stopping by driving and braking the wheels; and a cabin-side vehicle body which is mounted on the wheel-side vehicle body in such a manner as to be capable of turning at least to directions causing the driver seat respectively to face one and the other sides, in a travel direction, of the wheel-side vehicle body, the brake equipment comprising:
  a driver-seat-direction detector configured to detect whether the driver seat is facing the one or the other side, in the travel direction, of the wheel-side vehicle body;
  a braking unit configured to brake one-side wheels, which are located closer to the one side, in the travel direction, of the wheel-side vehicle body, and other-side wheels, which are located closer to the other side, in the travel direction, of the wheel-side vehicle body, while controlling brake-force distribution between brake forces of the one-side wheels and the other-side wheels in such a manner that the brake-force distribution becomes a set brake-force distribution based on ideal brake-force distribution characteristics; and
  a switching unit configured to change the set brake-force distribution in accordance with the direction of the driver seat detected by the driver-seat-direction detector.

2. The brake equipment of the vehicle with the driver seat whose direction is changeable according to claim 1, wherein the switching unit switches the set brake-force distribution to such a brake-force distribution that, of the one-side wheels and the other-side wheels, front wheels on the side which the driver seat is facing are given a larger brake force than rear wheels on an opposite side.

3. The brake equipment of the vehicle with the driver seat whose direction is changeable according to claim 1, wherein the braking unit includes
  a brake system for the one-side wheels, and
  a brake system for the other-side wheels that has the same specification as the brake system for the one-side wheels.

4. The brake equipment of the vehicle with the driver seat whose direction is changeable according to claim 3, wherein the braking unit includes
  a frictional braking unit configured to brake the one-side wheels and the other-side wheels through frictional braking with the same brake force, and
  a regenerative braking unit configured to brake the one-side wheels and the other-side wheels through regenerative braking under individual control, and
  the braking unit individually controls regenerative brake forces of the one-side wheels and the other-side wheels, and thereby controls the brake-force distribution between the one-side wheels and the other-side wheels in such a manner that the brake-force distribution becomes the set brake-force distribution.

5. The brake equipment of the vehicle with the driver seat whose direction is changeable according to claim 4, further comprising:
  a vehicle deceleration estimator configured to estimate a deceleration value required for the vehicle; and
  a target rear-wheel brake-force calculator configured to calculate a target brake force of the rear wheels from the required deceleration value estimated by the vehicle deceleration estimator, wherein
  when the frictional brake force of the rear wheels exceeds the target brake force of the rear wheels, the regenerative braking unit applies a motor drive power to the rear wheels by using a regenerative braking motor, instead of the regenerative brake force.

6. The brake equipment of the vehicle with the driver seat whose direction is changeable according to claim 5, wherein
  the target brake force of the rear wheels is a target rear-wheel brake force according to ideal brake-force distribution characteristics that cause the front wheels and the rear wheels to lock up simultaneously, and
  the braking unit controls the brake force of the front wheels in such a manner that the brake force of the front wheels becomes a target front-wheel brake force according to the ideal brake-force distribution characteristics.

7. The brake equipment of the vehicle with the driver seat whose direction is changeable according to claim 6, wherein
  the motor drive power to be applied to the rear wheels by using the regenerative braking motor is equal to a difference between the frictional brake force of the rear wheels and the target rear-wheel brake force.

8. A braking method for a vehicle with a driver seat whose direction is changeable, the vehicle including: a wheel-side vehicle body which has wheels suspended thereon and is capable of running and stopping by driving and braking the wheels; and a cabin-side vehicle body which is mounted on the wheel-side vehicle body in such a manner as to be capable of turning at least to directions causing the driver seat respectively to face one and the other sides, in a travel direction, of the wheel-side vehicle body, the braking method comprising:
  detecting whether the driver seat is facing the one or the other side, in the travel direction, of the wheel-side vehicle body; and
  braking one-side wheels, which are located closer to the one side, in the travel direction, of the wheel-side vehicle body, and other-side wheels, which are located closer to the other side, in the travel direction, of the wheel-side vehicle body, while controlling brake-force distribution between brake forces of the one-side wheels and the other-side wheels in such a manner that the brake-force distribution becomes a set brake-force distribution based on ideal brake-force distribution characteristics, wherein
  the set brake-force distribution is changed in accordance with the detected direction of the driver seat.

9. A vehicle with a driver seat whose direction is changeable, comprising:
  a wheel-side vehicle body which has wheels suspended thereon and is capable of running and stopping by driving and braking the wheels;
  a cabin-side vehicle body which is mounted on the wheel-side vehicle body in such a manner as to be capable of turning at least to directions causing the driver seat respectively to face one and the other sides, in a travel direction, of the wheel-side vehicle body;
  a driver-seat-direction detector configured to detect whether the driver seat is facing the one or the other side, in the travel direction, of the wheel-side vehicle body;
  a braking unit configured to brake one-side wheels, which are located closer to the one side, in the travel direction, of the wheel-side vehicle body, and other-side wheels, which are located closer to the other side, in the travel direction, of the wheel-side vehicle body, while controlling brake-force distribution between brake forces of the one-side wheels and the other-side wheels in such a manner that the brake-force distribution becomes a set brake-force distribution based on ideal brake-force distribution characteristics; and a switching unit configured to change the set brake-force distribution in accordance with the direction of the driver seat detected by the driver-seat-direction detector.

* * * * *